(12) United States Patent
Branson

(10) Patent No.: US 10,788,599 B2
(45) Date of Patent: Sep. 29, 2020

(54) UNDERGROUND UTILITY SURVEYING

(71) Applicant: CABLE DETECTION LIMITED, Stoke-on-Trent, Staffordshire (GB)

(72) Inventor: Simon Branson, Alton (GB)

(73) Assignee: CABLE DETECTION LIMITED, Cresswell (GB)

( * ) Notice: Subject to any disclaimer, the term of this patent is extended or adjusted under 35 U.S.C. 154(b) by 305 days.

(21) Appl. No.: 15/834,477

(22) Filed: Dec. 7, 2017

(65) Prior Publication Data

US 2018/0172868 A1    Jun. 21, 2018

(30) Foreign Application Priority Data

Dec. 21, 2016   (EP) .................................... 16206011

(51) Int. Cl.
*G01V 3/10*     (2006.01)
*G01V 3/15*     (2006.01)

(52) U.S. Cl.
CPC .  *G01V 3/10* (2013.01); *G01V 3/15* (2013.01)

(58) Field of Classification Search
CPC ... G01V 3/10; G01V 3/15; G01V 3/06; G01V 13/00; G01V 3/081; G01V 3/104; G01V 3/165; G01V 3/107; G01V 3/101; G01V 3/28; G01V 3/38; E02F 9/245; E02F 9/24; E02F 9/26; G01R 29/085; G01R 33/3657; G01R 33/3685

See application file for complete search history.

(56) References Cited

U.S. PATENT DOCUMENTS

| 3,108,220 A | 10/1963 | Ruddock |
| 3,466,533 A | 9/1969 | Doll et al. |
| 4,293,816 A * | 10/1981 | Johnson ................. G01V 3/107 324/329 |

(Continued)

FOREIGN PATENT DOCUMENTS

| EP | 1 843 177 A1 | 10/2007 |
| EP | 2 278 358 A1 | 1/2011 |

(Continued)

OTHER PUBLICATIONS

Extended European Search Report dated Mar. 27, 2017 as received in Application No. 16206011.5.

*Primary Examiner* — Lee E Rodak
(74) *Attorney, Agent, or Firm* — Maschoff Brennan

(57) ABSTRACT

A mobile detection device evaluating a depth of an occluded underground elongate utility line. The device comprises at least a first and a second detector unit, each comprising at least a detection loop and corresponding transmitting loop arranged close together. The device also comprises at least one excitation coil for emitting an alternating electromagnetic excitation field with its emission direction substantially in line with the sensitivity direction of the detection loop. The device has an electronic signal evaluation unit for detecting the utility line according to an electrical signal induced in the detection loops and evaluating the depth according to a difference of the electrical signal in-between the detection loops. There is a compensation unit built to apply an electrical signal to the transmitting loops for establishing a compensation field, which nullifies influences of direct coupling residuals of the excitation field at the detection loops.

14 Claims, 10 Drawing Sheets

(56) References Cited

U.S. PATENT DOCUMENTS

| | | | |
|---|---|---|---|
| 4,438,401 A | | 3/1984 | Iwamoto et al. |
| 5,043,666 A | * | 8/1991 | Tavernetti ............ G01R 29/085 |
| | | | 324/202 |
| 5,194,812 A | * | 3/1993 | Yokoi ...................... G01V 3/06 |
| | | | 324/326 |
| 6,407,550 B1 | * | 6/2002 | Parakulam ............... G01V 3/15 |
| | | | 324/326 |
| 7,834,801 B2 | * | 11/2010 | Waite ...................... G01S 13/86 |
| | | | 324/329 |
| 8,164,338 B2 | | 4/2012 | Fling et al. |
| 8,183,867 B2 | | 5/2012 | Fling et al. |
| 8,209,136 B2 | * | 6/2012 | Li ............................ G01V 3/38 |
| | | | 702/38 |
| 9,945,976 B2 | * | 4/2018 | Olsson ..................... G01V 3/15 |
| 2002/0043976 A1 | * | 4/2002 | Holladay, III ......... G01V 3/104 |
| | | | 324/334 |
| 2008/0297158 A1 | * | 12/2008 | Heger .................... G01V 3/107 |
| | | | 324/326 |
| 2015/0253450 A1 | | 9/2015 | Krapf et al. |
| 2016/0097874 A1 | | 4/2016 | Branson |
| 2016/0109608 A1 | | 4/2016 | Branson |

FOREIGN PATENT DOCUMENTS

| | | | | |
|---|---|---|---|---|
| EP | 2 362 241 A1 | | 8/2011 | |
| EP | 2 645 133 A1 | | 10/2013 | |
| EP | 2 804 020 A2 | | 11/2014 | |
| EP | 2804020 A2 | * | 11/2014 | ............. G01V 3/104 |
| EP | 3 002 614 A1 | | 4/2016 | |
| WO | 2008/064851 A2 | | 6/2008 | |
| WO | 2008/064852 A2 | | 6/2008 | |
| WO | 2011/104314 A2 | | 9/2011 | |

\* cited by examiner

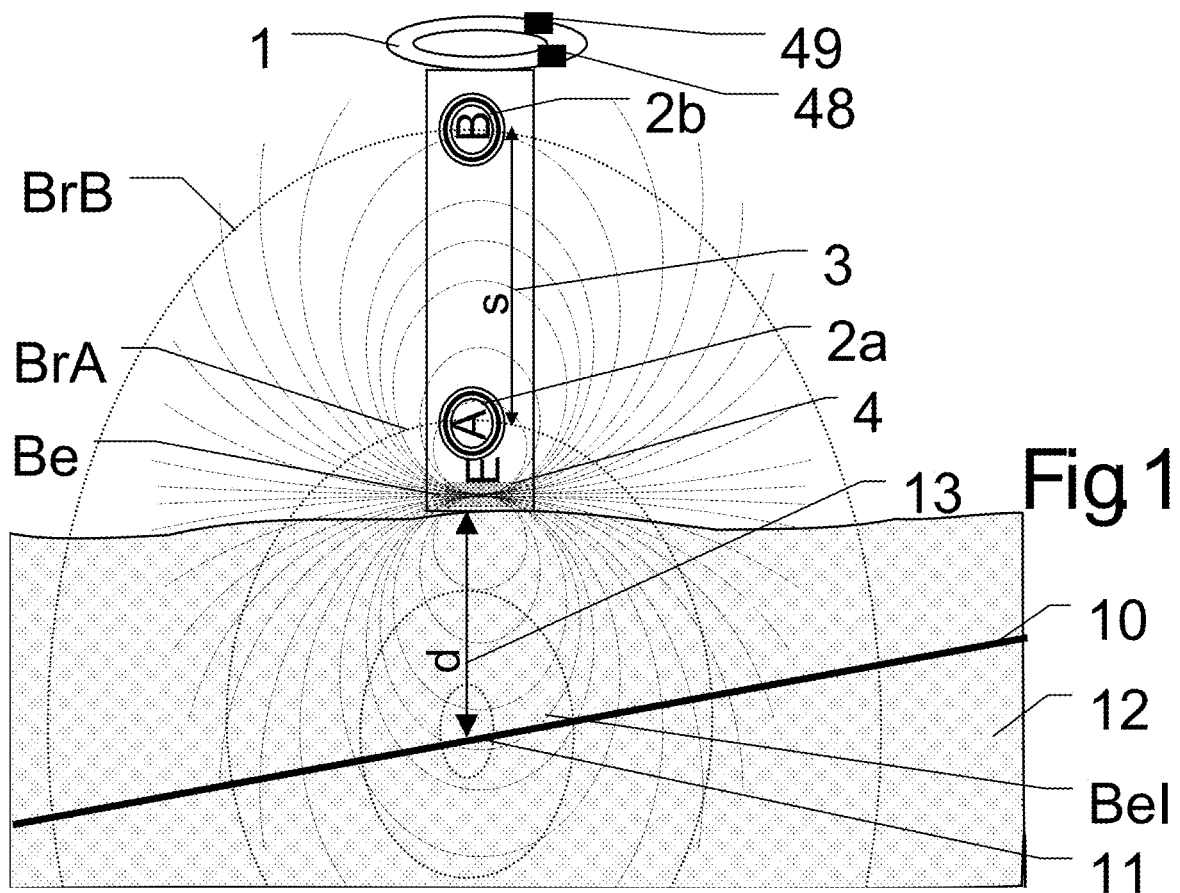
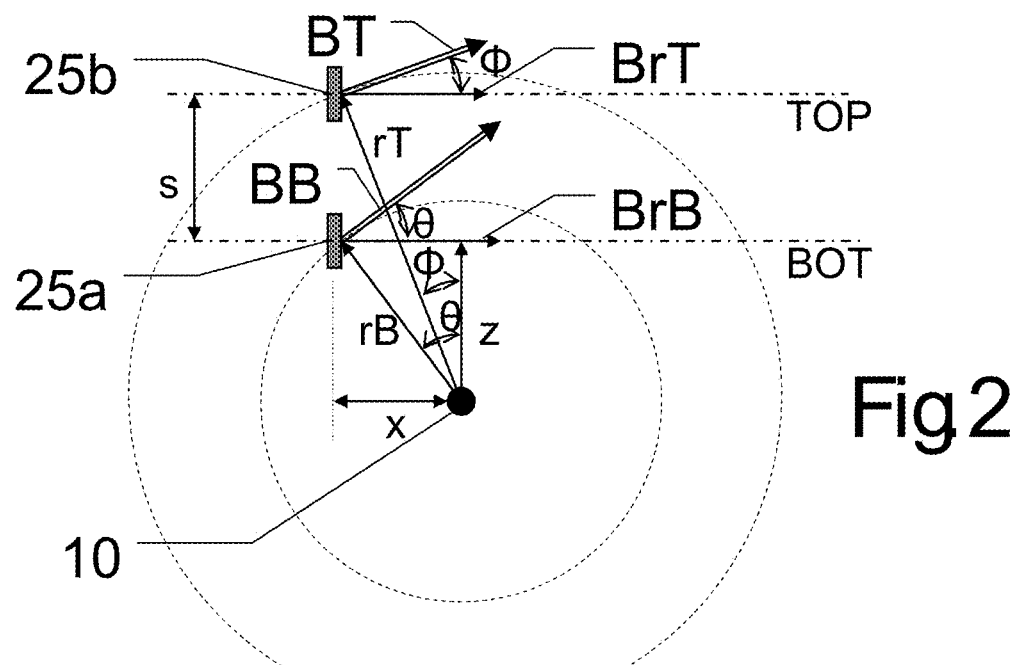

UNDERGROUND UTILITY SURVEYING

CROSS-REFERENCE TO RELATED APPLICATIONS

This application claims priority to European Patent Application No. 16206011 filed on Dec. 21, 2016. The foregoing patent application are incorporated herein by reference.

FIELD OF INVENTION

The present invention relates generally to a mobile detection device and a method of detecting underground utility-lines.

BACKGROUND

It is a common task on construction sites to use devices for detecting underground utility lines, in particular before or while earth-moving. Such buried services are often occurring in form of utility-lines for supplying electricity, gas, fuel, water, or communication data, etc. by a variety of types of underground structures. As damage to such a utility can cause serious impact and costs, additional measurements are taken in order to be able to detect the proximity or preferably also the exact location and/or depth of such utilities on the site before or while excavating. Thereby, a path which the buried utility is following and/or a depth in which the utility is buried (e.g. as a distance from the detection device to the utility) can be determined or verified. Devices for this purpose are known as Cable Detection Tools or Cable Avoidance Tools—also called CAT. An example of a hand-held detection device which is designed and built movable in order to be carried around by a worker, can be found in EP 2 362 241. In special movable embodiments, such a detection device can also be applied to at a bucket of an excavator and moved with the bucket.

One way to locate underground utilities is to detect electromagnetic fields emitted by the nature of the utility itself. This applies to utilities having a naturally occurring electrical signal, which signal emits an electromagnetic field that is detectable above the ground, such as e.g. a live power supply line, communication cables, etc. As shown e.g. in WO 2011/104314, WO 2008/064851 or WO 2008/064852, the depth or distance to a buried utility can therein be determined according to a difference in signal strength at two or more detectors or pickups, which are located in a known spacing with respect to each other.

To detect a utility without a naturally occurring signal, (for example a wiring system of switched off street lights, unused or low-voltage communication cables, gas- or water-pipes, etc.) an artificial signal can be conducted to the utility. For example, in U.S. Pat. No. 4,438,401 a metallic utility without a naturally occurring signal is directly connected to a signal-generator. In U.S. Pat. No. 5,194,812, a hollow pipe, like a gas or water pipe is detected by introducing a conductor or sonde into it. In EP 9 166 139 or EP 2 645 133, a electrical signal is coupled into a conducting underground structure by introducing a current from an AC current-source into soil by some earth-spikes, resulting in the current to follow preferably along the conductive structure as path of least resistance through soil.

Still, detecting utilities which are not naturally carrying a detectable electrical current is bothersome, requires additional external equipment and can fail in many ways.

SUMMARY

It is an object of some embodiments of the invention to improve the detection of non current carrying underground utilities, preferably without additional equipment. Preferably, such can also be done simultaneously or quasi-simultaneously to a classic detection of utilities which are carrying current by their nature.

According to some embodiments of the present invention, this object is solved by including an emitter for an electromagnetic field into a classical detection device comprising at least two detection coils or loops. This transmitted field will generate an electrical current in or around the utility to be detected. Thereby, the device can detect also utilities without electrical currents or with undetectable currents, e.g. utilities which are only emitting very weak fields or fields in frequency ranges which are not explored by the detection device or do not well penetrate into soil.

Those currents in the utility, which are resulting from the transmitted field from the detection device, are often only comparably low, in particular as transmission power is limited and/or the coupling to the utility can be quite low. Therefore, also the signals from the utility to be detected at the receivers of the detection device are quite low. Therein, it can be advantageous that characteristics like frequency, modulation and/or coding of the transmitted signal from the device is known—so that a strong filtering, matching and/or mixing can be applied at the receiver side. But still, it can be problematic that only a comparably weak signals and a low SNR will be achievable. This is in particular true, as the transmitted signal from the emitter at the detection device itself contributes to the "noise" portion—as the close proximity of the transmitter can results in a much stronger signal at the receiver than the one from the utility which is intended to be detected. Another object of the present invention is therefore to improve detectability of a utility in such a setup—in particular to improve the SNR. Preferably, this object involves improvements at the receivers of the detection device, but also goes beyond this.

For achieving a decent coupling from the emitter to the underground utility and in view of the detectability of the signal from the underground utility, it is preferred to arrange the emitter with its main transmission direction—which is the direction having the maximum of the transmitted energy—to substantially match with the highest sensitivity direction of the receivers. In other words, the transmitter and receiver are arranged and oriented to achieve a substantially maximum coupling with respect to each other, at least in theory or as far as practically possible. For example, when using wire turns such as coils or loops as emitters and/or receivers, their main or maximum transmitting and receiving direction is in general substantially orthogonal to the winding plane of the coil windings or in other words along the axis of the winding. The lowest or zero sensitivity and/or transmission applies substantially for fields oriented in direction of the winding plane. In other words, according to the invention, a transmitting coil and a receiving coil can be arranged with substantially in-line, parallel of coinciding winding planes or sensitivity/transitivity directions.

In completely different fields of the art, like mine detection, archaeology, geology, or treasure hunting, so called GPR (Ground Penetrating Radar) systems are used to try to explore hidden underground obstacles. Those systems are based on a transmission of an electromagnetic field into a specific direction towards ground and determining a so called time of flight of those portions of the emitted field, which are reflected back at an underground interface boundary layer of changing electrical impedance. By using pulsed signals, measuring time of flight and concerning the velocity of propagation of the electromagnetic waves, a distance value to the obstacle is determined. Such is known as the "radar-principle", wherefrom the name GPR results.

Yet another substantially completely different class of devices are metal detectors which are used to find metallic items at ground level, for example as often used by treasure seekers at the beach looking for lost coins and jewellery at the surface, etc. Such a metal detection is achieved by transmitting and receiving an electromagnetic field and observing changes to the electromagnetic environmental impedance due to influences from metallic items in close vicinity. Any changes in the electromagnetic impedance of the surrounding of the device are detected and indicated to the operator—commonly by modulating an acoustic signal. Beside the different and completely unrelated field of the art, there are and many other technical differences, e.g. like they only establish a mere presence estimation and not a location as a detection device does. Also, due to soil conditions, in particular moisture, such metal detectors have a negligible low ground penetration depth in the range of a few centimetres only which is sufficient for their specific purpose.

According to a further aspect of some embodiments of the present invention, the above described approaches can even be further improved. The above discussed physical coupling of the emitters and receivers in the detection device strongly depends on their arrangement and alignment and also the electromagnetic environment—even e.g. a metallic screw, some switch, a battery at the detection device, etc.—influences the magnetic fields. Also, a worksite environment or tools carried by the executing worker, a belt buckle or steel-toed boots of an operator, can divert the field geometry from a factory calibrated setup. Another problem of devices according to the invention is, that those are regularly exposed to quite harsh environmental conditions at worksites, in particular being exposed to heat, concussions and vibrations in cars when transported, accidental dropping or knocking over, exposure to direct sunlight, snow, rain, water, dirt, etc. Therefore, even if regularly factory calibrated, the actual calibration might be or get ill-fitting in actual field operation. Beside a displacement of the coils or antennas, also aging, temperature drifts of the electronics in field-usage can have negative impact. Therefore, disadvantageously, the guaranteed accuracy levels of the depth values determined by such devices have to be generally kept relatively low, e.g. within some decimetres to metres.

Summarized, it is therefore an object of some embodiments of the invention to improve such a detection device for underground utilities, in particular to also detect those utilities which are not carrying an electrical current by their nature, by their purpose or by artificial introduction.

A particular object of some embodiments of the invention is to improve the accuracy and/or reliability of the detection, in particular to improve the robustness of the detection device against environmental influences and electrical and mechanical tolerances.

It's also a preferred object of some embodiments to provide a detection device for buried utilities, which is built to be self-optimizing, without requiring external equipment or a special setup, preferably in the field by the device on its own.

A particular object of some embodiments is to provide a single detection device which can detect and spatially locate current carrying and non current carrying utilities buried in soil. This should preferably be achievable either selectively separated or simultaneously to get two detection results which can be compared, matched or verified.

Those objects are achieved by realising the features of the independent claims. Features which further develop the invention in an alternative or advantageous manner are described in the dependent patent claims.

Some embodiments of the present invention therefore relate to a mobile detection device for an evaluation of a depth value from the device to an occluded underground elongate utility line. This device comprises at least a first detector unit and a second detector unit. In other words, it can be a mobile detection device for an evaluation of a distance value from the device to an occluded ac-current carrying utility according to the utilities emanated magnetic field. For example, a cable detection device for a location of buried utilities like electrical wiring, cables, gas or water pipes, etc. which are occluded underground at a construction site. The device is thereby in particular built to determine the depth, in which the utility is buried.

Each detector unit comprises at least a detection loop and a corresponding transmitting loop. The detection loop as well as the transmitting loop, each have at least one winding of an electrically conductive material, preferably they can have multiple windings each. The detection loop and the corresponding transmitting loop are therein arranged closely together at each of the detector units. Preferably, the detection loop and the corresponding transmitting loop are arranged on a common rigid carrier. For example, the loops are arranged close by, contiguous, collateral, close-set, adjacent, verging or adjoin to each other. The detector units are arranged with a, preferably defined or known, spacing with respect to one another. The loops can each comprise at least one or more winding of an electrically conductive material. The loops of the detector units can preferably be an air core design, which means having no ferromagnetic core in the centre of the loop. The winding is enclosing an area and can be of arbitrary shape, e.g. round, circular, rectangular and can be preferably substantially flat, with a height comparably much lower than the outer dimensions of the enclosed area. The detection loops and/or transmitting loops could alternatively also be referenced as coils or antennas. Therein, the detection loops can for example each have a low winding count of 1 to 500 turns of a conductor with a cross-section of at least about 0.1 mm$^2$, in particular wherein the winding of the detection loop encloses an area of more than 100 cm$^2$ and below 0.5 m$^2$, preferably with a approximately rectangular or circular cross-section. In any of above embodiments, the output impedance of the detection loop can be above the input impedance of the first amplification stage to which the detection loop is connected.

The device according to some embodiments of the invention also comprises at least one excitation coil for emitting an alternating electromagnetic excitation field of a defined characteristic, for example by applying a defined alternating current to the excitation coil. The excitation coil is arranged in such a way, that the magnetic sensitivity direction of the detection loops is substantially in line with the magnetic field emission direction of the excitation coil, or in other words in such a way that there is a substantial or at least almost maximum magnetic coupling in-between excitation coil and detection loops. The arrangement of the excitation coil and detector units can be fixed, which means that they are not built to be moved with respect to each other during a depth measurement. Nevertheless, e.g. due mechanical shocks, temperature influences or the like, the coils arrangement can vary in small tolerances over time, mostly unintended.

The device according to some embodiments of the invention also comprises an electronic signal evaluation unit for detecting the utility line. The detection is done according to electrical signals, which are induced in the detection loops of the detector units by a magnetic field emanated by the utility, due to some alternating current at the utility line. The electronic signal evaluation unit therein evaluates the depth value according to a difference of the electrical signal in-between the detection loops of the first and second detector units. For example, the signal evaluation unit can therein comprise at least one of:

- an amplifier circuit connected to the detection loop, for amplifying the electrical signal induced in the detection loop by the magnetic field from the utility,
- a bandwidth limiting filter for the electrical signal, which is built to suppress undesired frequency ranges and/or to avoid aliasing,
- an analog to digital converter for digitizing the filtered output of the amplifier circuit to a time and value discrete digital representation, and/or
- a computation unit built in such a way to detect the utility according to an evaluation of the digital representation, in particular according to a difference in signal strength in-between the at least first and second coil.

The device according to some embodiments of the invention also comprises a compensation unit, built to apply an electrical signal to the transmitting loops, for establishing a compensation field by the transmitting loops at the first and second detector units. This compensation field is established in such a way, that it—in particular at least substantially of virtually—nullifies direct influences of the excitation field at the detection loop at the first and second detector units.

The detection loop and the corresponding transmitting loop can therein in particular be concentric and adjoin to each other. The detection loop and the corresponding transmitting loop can in particular be magnetically coupled or strongly magnetically coupled and can be sharing their sensitivity areas, which sensitivity areas can be substantially the same. The transmitting loop and the detecting loop can be magnetically coaxial to each other and/or the transmitting loop and detecting loop can be on a common, preferably one-pieced, rigid carrier. In an embodiment of a detection device according to the invention, the coils planes of the detection loops (and consequently also of the transmitting loops) are arranged substantially vertical during the detection of a buried utility—expect a negligible side to-side swinging motion of the whole device by the operator for covering the detection area.

The detection loop can therein be connected to an input of a RX-amplifier of a receiving section, in particular to a current sensing transimpedance amplifier as RX-amplifier. Such a first amplification stage, which is connected to the detection loop can in particular be embodied as a transimpedance amplifier, preferably having a low input impedance, for example below 100 Ohm in the relevant frequency range of about 50 to 100.000 Hz, and can be tuned to have a substantially linear output over a frequency range of about at least 100 to several hundred kHz. For example, a current sensing amplifier can comprise an operational amplifier (OpAmp) with a feedback network in a current to voltage configuration. This circuit can in particular be embodied in way that the negative OpAmp input is connected to one end of the coil, the other end of the detection coil is connected to the positive OpAmp input and the OpAmp output is fed back to the negative OpAmp input by a first impedance, in particular a resistive and capacitive impedance.

The transmitting loop can therein be connected to an output of a TX-amplifier of a transmitting section, in particular to an alternating current source providing an electrical transmitting signal having a definable or controllable current signal generator output. In an alternative configuration, also a dynamically configurable voltage supply can be applied to the transmitting loop. For example, the TX-amplifier can be a driving stage, following the output from a digital to analog converter.

In an embodiment, the excitation signal applied to the excitation coil can for example be a sine wave of known or definable frequency and/or phase. In another embodiment, the excitation signal can also have another waveform and/or can have a variable or modulatable amplitude and/or frequency, whereby in a special example the excitation signal can be modulated or coded in such a way to make it uniquely distinguishable from other environment signals and noise. For example, the excitation signal can be provided by a driving stage which is following the output from a digital to analog converter.

According to some embodiments of the invention, a coil-plain of the excitation coil can be substantially parallel or coinciding with respect to a coil-plain of the first and second detection loop, in particular in such a way that a coupling of the transmission coils emitted field towards the detection loops is—at least theoretically—substantially maximized. In particular, the excitation coil can be arranged asymmetrically with respect to the first and second detector units, which means not in the middle in-between the detector units. Such an arrangement can bring advantages in view of the coupling relationships in-between the detection loops, transmission loops and the excitation coil, whereby solvability of the resulting equations can be improved in view of the present invention. For example, the excitation coil can be arranged at the bottom of the detection device, in particular below the bottom one of the detector units, which is closer to the utility line to be detected.

The detector units can be arranged at fixed locations and the spacing of the detector units can be approximately oriented in line with the direction toward the utility line to be detected. The detection loop and the corresponding transmitting loop of at least one of the detector units can be embodied as tracks on a single printed circuit board (PCB). The PCB can in particular also comprise an RX-amplifier stage, e.g. a current sensing amplifier or a transimpedance amplifier. The detection loops and transmitting loops can be air core designs without a magnetic core, while the excitation coil comprises a ferrite core.

The compensation unit can comprises a control loop for adjusting the compensation field to achieve nullification, which control loop is having a time constant being longer than a time constant for detecting the utility line. The time constant can in particular be substantially longer, for example tens, hundreds or thousand times, longer or more. For example, such a time constant can be in the order of magnitude of multiple seconds to minutes or longer.

The compensation unit can especially be built for a simultaneous applying of an individual electrical signal to each of the transmitting loops at both detector units and for an individual controlling of those applied individual electrical signals in such a way, that a simultaneous nullification at both detector units is established, wherein a crosstalk in-between the detector units is considered—by which the compensation signal at one detector unit also influences the other detector unit.

In a specific embodiment comprising a calibration of the detection loops, a calibration section of the compensation unit can evaluate a difference in-between the individual electrical signals during active detection while the excitation coil is turned on. Based thereon, the calibration section can derive calibration parameters for the detection device, e.g. in view of sensitivities, signal offsets, signal phases and/or the geometrical alignment of the coils and loops.

The device can optionally also comprises a self calibration unit for a calibration of a sensitivity of the detection loops. Such can be done by transmitting and evaluating a calibration field mutually in-between the first and the second detector units directly within the device itself, without requiring external equipment. Therein, in an embodiment according to the invention, the same transmitting loop can be used for a transmitting of a calibration field during self calibration (when the excitation coil is turned off), as well as for a transmitting of the compensation field during active detection (when the excitation coil is turned on). Accordingly, a combined compensation and calibration unit can be established according to the present invention, which is sharing the same hardware, at least partially or even fully.

Some embodiments of the invention also relates to a method for a mobile detection device which comprises multiple detection loops for an evaluation of a distance or depth value from the detection device to an occluded ac-current carrying utility, in particular for a location of utilities occluded underground at a construction site, according to magnetic fields emanated at the utilities, which detection device comprises an excitation coil, for example by detection device as described above.

Such a detection method for evaluating of a depth value of an occluded underground elongate utility line by a mobile detection device comprises at least the following. An emitting of an alternating electromagnetic excitation field having a defined characteristic is established by applying an electrical excitation signal to at least one excitation coil at the detection device. In particular, such is done for inducing an induced current at the utility line, which induced current is emitting a detection field from the utility line. According to this detection field, the utility is detectable, also when the utility itself might not have a naturally occurring electrical current on its own.

The method also comprises a detecting of a magnetic field by at least two detector units of the device, which are arranged in a defined spacing with respect to one another. Each detector unit comprises a detection loop which has at least one winding of an electrically conductive material from doing so. In the device, the excitation coil is substantially arranged in a coupling arrangement with respect to the detection loops, for example in such a way that the sensitivity direction of the detection loop is substantially in line with the field emission direction of the excitation coil.

According to a difference of the electrical signal in-between the detection loops of the at least two detector units, an evaluating of the depth value from the device to the utility line is done.

According to some embodiments of the invention, also an applying of a nullification signal at a transmitting loop, which is contiguous to a corresponding of the detection loops of each of the detector units. Thereby, a nullification of direct influences of the excitation field from the excitation coil to the detection loop is done by establishing a magnetic compensation field by the transmitting loops. In other words, a nullification in form of a physical cancellation of direct influences from the excitation coil to the detection loop is done, at least wherein the nullification is virtually a nullification or a reduction of signal strength to at least less than half of the residual direct influences without nullification, preferably a reduction to below 10% or below 3% or less. As the to be nullified, direct coupling turns out to be rather static and constant, adjustments to the nullification signal can be done only from time to time and/or continuously with a very long time constant in the range of minutes or more.

Such can comprise an applying of an electrical nullification signal to the transmitting loops for establishing the magnetic compensation field which is done by evaluating a received signal from the detection loop for portions of the excitation signal, an applying of a complex transformation in amplitude and phase to the excitation signal and an applying of the resulting nullification signal to the transmitting loop. Therein, a specific electrical nullification signal can be applied simultaneously at each one of the at least two detector units, such that crosstalk in-between the at least two detector units is taken into account and the nullification is achieved simultaneously at both detector units by different nullification signals at both detector units.

The thereby established magnetic compensation field can be adjusted automatically by a control loop for the nullification, in particular with a time constant of the control loop for nullification being longer than a time constant for the detection, for example, multiple seconds to minutes long. In an embodiment, the automatic adjusting by the control loop can therein be done specifically in a quiet electromagnetically environment and the results being stored or it can be done continuously during field operation, wherein the long time constant suppresses dynamic influences such as those from detected utilities.

The evaluating of the depth value can therein be done by a detecting of magnetic fields from utility-line currents which are induced by the excitation field (Be), which can preferably be combined with a detecting of magnetic fields from naturally occurring or artificially conducted utility-line currents, for example also simultaneously.

Some embodiments of the invention can also comprise a method for sensitivity improvement of a detection loop at mobile detection device which comprises at least two spaced apart detector units with detection loops, and an excitation coil arranged to be virtually magnetically coupling to the detection loops. Therein the direct coupling portion of a magnetic excitation field from the excitation coil to the detection loop would tend to saturate and/or offset the detection loop and/or a following electronic receiving stage. Therefore, the invention comprises a supplying of a nullification current to a transmitting loop which is contiguous to the detection loop, which nullification current is provided in such a way, that a physical nullification of the direct coupling portion of a magnetic excitation field is effected at the detection loop.

The method, or at least those parts of it which involve computation and/or calculation, can also be embodied as a computer program product that is stored on a machine readable medium or which can be embodied as electromagnetic wave (such as e.g. a wired or wireless data signal). Consequently, the invention further relates to such a computer program product comprising program code for an excitation signal nullification at a detection device according to the invention. The program code is therein in particular built for executing an analyzing a digitized output signal from a detection loop of the detection device, identifying and evaluating a direct coupling portion of an excitation signal from an excitation coil of the detection device to the detection loop within the digitized output signal, calculating a desired nullification signal for cancelling out or nullifying the direct coupling portion of an excitation signal, and a providing the desired nullification signal to be supplied as an analog nullification current at a transmitting loop for emanating a magnetic nullification field by the transmitting loop at the detection loop.

The computer program can be executed in a nullification unit of a detection device according to the invention, which device therefore also involves a computation means built to run a computer program providing nullification functionality according to the invention, with or without the computer program actually loaded.

BRIEF SUMMARY OF THE DRAWINGS

Devices, methods and setups according to the invention are described or explained in more detail below, purely by way of example, with reference to working examples shown schematically in the drawing. Specifically, FIG. 1 shows an example of an embodiment of a mobile detection device to which the present document relates;

FIG. 2 shows an example of an embodiment of a detection principle to which the present document relates;

DETAILED DESCRIPTION

Figure 3:
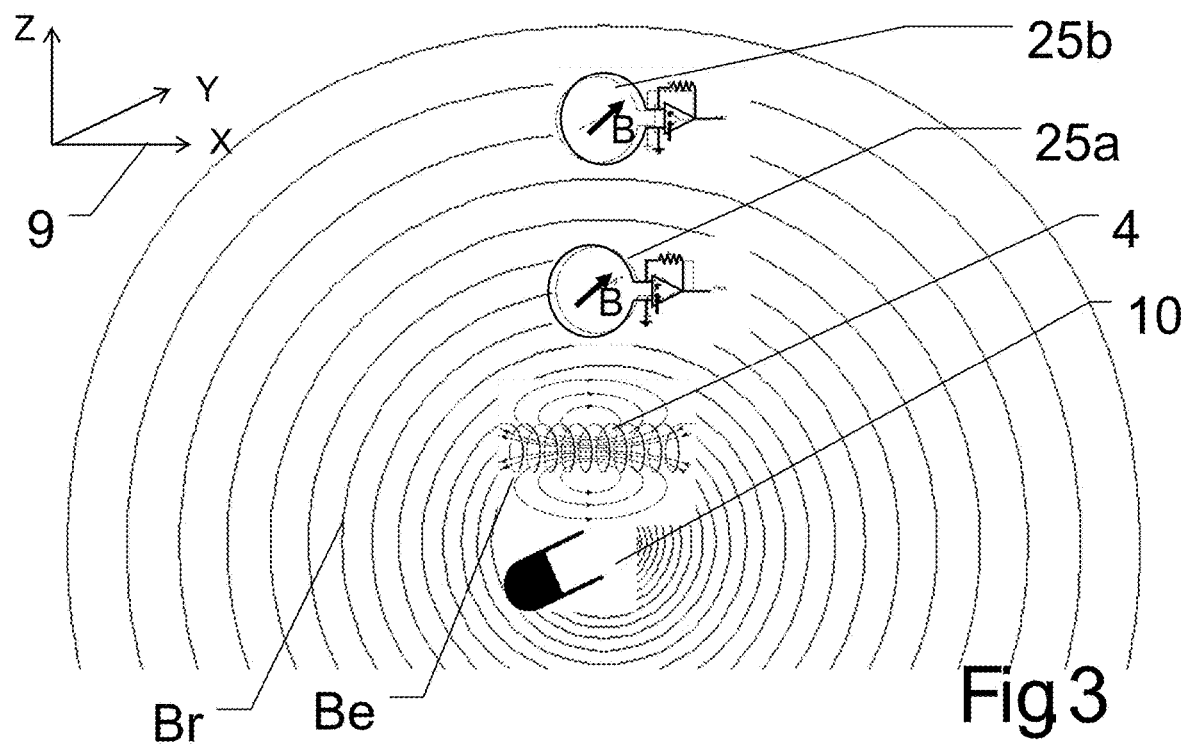
FIG. 3 shows a first example of an embodiment of magnetic fields at a mobile detection device to which the present document relates.

The diagrams of the figures should not be considered as being drawn to scale. Where appropriate, the same reference signs are used for the same features or for features with similar functionalities. Different indices to reference signs are used to differentiate between different embodiments of the same or an equivalent feature that is shown exemplary. The term "substantially" is herein used to describe the fact that that a certain value, arrangement or feature does not necessarily need to be 100% exact, but can maybe slightly aberrate, while still being within scope. In other words, there can be some slight deviations, e.g. due to inaccuracies, unintentional, design considerations, tolerances, etc.—but there is a clear tendency towards the mentioned value or arrangement, in particular in view of the technical effect to be achieved therewith. Especially, it is not meant to be an obvious opposite. In any case, besides the meaning of "almost exactly" the term "substantially" can always be interpreted to comprise or also express the meaning of "exactly", or of the particular feature itself.

FIG. 1 shows an embodiment of a mobile detection device 1 which can be used for an evaluation of a distance value 13 "d" from the device 1 to a utility 10 buried in ground 12. Some alternating electrical current 11 at the utility 10 results in the utility 10 to emanate a magnetic field BrB,BrA. The device 1 comprises at least two receivers or detector units 2a,2b comprising detection coils 25, as the shown "A"-coil at 2a and a "B"-coil at 2b, which are arranged in a spacing 3 "s" with respect to each other. The magnetic field emanated from the utility 10 is exemplary illustrated by the magnetic field lines BrA and BrB, where the third character indicates the place of detection—which is the "A"-coil 25 at detector unit 2a respectively the "B"-coil 25 at detector unit 2b.

By the first magnetism-sensitive receiver—here shown as detection loop 25a at detector 2a, and the second magnetism-sensitive receiver—here shown as detection loop 25b at detector 2b, the utility 10 is detected according to its magnetic fields BrA,BrB picked up by those receivers. The buried utility 10 can therein be considered as a long conductor, emitting the magnetic field. The two sensing points at 2a and 2b are used to determine a distance to the utility 10. The depth 13 from a defined point of the device 1 to the buried utility 10 can be mathematically expressed by the formula $$d = \frac{s}{\left(\frac{A}{B}\right) - 1},$$

wherein "d" is the value of the depth 13, "A" is the magnetic field strengths at the coil 2a and "B" at the coil 2b, and "s" is the separation 3 of coil 2a and coil 2b. In particular, a minimum distance is the basic technique used to locate a buried cable.

Strictly speaking, the depth 13 in this formula is determined with respect to the central axis of the detectors 2a,2b comprised in the device 1. This can be referenced to ground level by knowing, defining or determining a ground distance from ground to the underside of the device 1 and applying an offset to the depth value provided by the device 1. For example, the underside of the device 1 can be put down on ground level, a working distance from the underside to the ground 12 at which the device 1 has to be operated can be defined or the detection device 1 comprises at least one proximity-sensor like an optical or ultrasound distance measurement unit at the underside of the device 1. The thereby determined proximity value can be used as an offset for the determined depth 13, so that the indicated depth value is always relative to ground level.

Apparently, also more than two magnetic detector units 2 then the above described two detectors 2a and 2b can be used for the detection, in particular for providing redundant data and/or increased accuracy. For detecting the utility 10 and/or determining its depth 13, the device 1 comprises a (here not explicitly illustrated) electronic signal evaluation unit, preferably comprising a programmable and/or hardwired digital computation unit, like a microprocessor, DSP, FPGA, ASIC, etc.

As in prior art, the service-line or utility 10 can e.g. be an underground cable, sonde, pipe, etc. carrying per se an electrical current or having an artificially introduced an electrical current by conducting a signal from a separate signal generator device to the utility. But according to the present invention, the utility 10 can also be without a naturally occurring current or without an artificially conducted electrical current from a remotely located current source.

The detection device according to the invention also comprises an excitation coil 4, in this embodiment explicitly shown as a coil-transmitter labelled "E". The here shown coil-transmitter 4 has preferably a magnetic core for bundling the emission field, like a ferrite, but other embodiments according to the invention can alternatively also comprise a coil-transmitter 4 without a magnetic core. The excitation coil 4 emits an alternating electromagnetic field Be. This field couples to the underground utility 10—as shown by the magnetic field-lines of Bel, and locally induces an electrical current 11 at the utility 10. Details will be described in the following. This current 11 at the utility 10 results in an emission of a magnetic field at the utility 10, which can be picked up by the detector unit 2a as BrA and the detector unit 2b as BrB. Thereby, the utility 10—regardless initially carrying an naturally occurring electrical current or not—can be detected and/or located as it is described herein.

The basic idea of somehow including an excitation transmitter in a detection device might not be completely new. Still, there are no reasonably practically usable prior art devices available which are employing such. Reason is that such an implementation is not straight forward applicable and that there are a plurality of challenges to be overcome.

For example, due to the close proximity of an excitation emitter 4 that is comprised in the same device 1 as the detection coil 25, there is a strong coupling of the emitter's field Be to the detectors 2. This leads to a saturation of the detection coils 25 and their output signal 6. Or in other words, at the required, reasonable levels of the field Be emitted by the emitter 4 to reach the buried utility 10 with reasonable signal level, the portion of the emission field Be emitted by the emitter 4 that is picked up by the detectors 2 is in general orders of magnitude stronger than the one from the utility 10 which has to be actually detected. This is in particular true, when the utility 10 is buried in soil 12 at a depth of more than just a few cm or dm—since meters of moisture soil 12 is much less penetrable than e.g. a few cm of dried concrete, wood, etc. Thereby, the receiving section of the detector units 2 will get saturated or overloaded, or at least the signal (from the utility 10) to noise (directly from the emitter 4) ratio will be very bad, likely too bad for a reliable detection. That's also on of the reasons why different types of devices, which are not related to the presently claimed invention, employing time of flight approaches with pulsed signals or determining impedance, were developed.

It would be helpful to substantially arrange and orient the excitation coil emitter 4 in such a way, that it produces virtually no or at least a minimum field component in the sensitivity direction of the detector units 2, for example orienting excitation and detection substantially orthogonal to each other. Still, such would bring the disadvantage that—to achieve the best coupling from and to the underground utility—the excitation and detection have to be substantially oriented in the same direction, resulting in a strong local coupling from the excitation coil 4 to the detection loops 25a and 25b. Thereby, the receiving antennas 25a,25b will tend to be saturated due to close proximity of the emitter 4. Therefore, a direct coupling portion of the excitation signal will always be present at the detection loops 25a and 25b, which will in general be larger in magnitude than the signal which is desired to be measured and also larger than any field from a naturally occurring current at a utility line which is also desired to be detected. This is one of the reasons why prior art worksite underground utility detection devices 1 are not employing such an approach.

The shown detection device 1 according to the invention can optionally also comprises a self calibration unit 48 for establishing a self calibration of the detection loops, which can preferably be at least partially combined with the compensation unit 49 for establishing the nullification during an active detection mode. Details on how the device according to the present invention, which comprises an excitation coil 4 and at least two spaced apart detector units 2, establishes the finding of the utility 10 will be described in the examples of the following embodiments in more detail.

FIG. 2 illustrates an embodiment of a detection and location of a buried utility 10 according to the present invention by the detection device 1, wherein the focus of this section lies primarily on the detection and depth determination aspect by the detection loops at the detector units 2 used according to the present invention.

For the above described detection of a buried utility 10, the detection loop 25a respectively coil 25b are each connected to evaluation electronics, e.g. to an amplifier, filter and/or analog to digital converter, which is then providing data to a computation unit. The detection loops 25 comprise in particular one or preferably more than one winding of electrically conductive material. Preferably, a certain received signal of interest can be selected by the evaluation electronics and/or the computation unit, so that the detection system in order to reduce influences by outside interferences or noise. For example, specific frequencies for emission and/or reception can be selected, and/or the excitation of the excitation coil 4 can be specifically modulated and/or coded. In accordance with the emission signal, the reception signal can be accordingly demodulated and/or deciphered to differentiate and/or identify the desired signal from other external signals not being of interest. In an advanced embodiment according to the invention, the characteristics of the receiving detection loops 25a and 25b, and preferably also those of the whole receiving circuitry up to the digitalized values, can be determined and calibrated by a calibration process, e.g. as described in EP 1 843 177 or in EP 3 002 614, in particular applying synergies of nullification and calibration according to an embodiment of the invention.

The detection loop 25a receives the magnetic field BrA and the detection loop 25b receives the magnetic field BrB, which field BrA and BrB are actually part of the same field which is emitted at the utility 10. The detected signals from the detectors 2a and 2b can then be analyzed and/or stored by the evaluation unit, e.g. the signal strength, an eventually occurring phase shift, etc. can be determined. Thereof, and in knowledge of the separation s of the detectors 2a and 2b, the value z, which represents depth information from the detection device 1 to the utility 10 can be determined according to the basic formula specified above. The geometric principles, on which this depth determination relies, can be seen in this figure.

According to the present invention, the magnetic field from the utility 10, which field is exemplary illustrated by BrA and BrB, results, at least partially, from a current at the utility 10 that is not per se naturally occurring at the utility 10, but which is a result from a excitation coil 4 comprised at the detection device 1. As shown in FIG. 1, the excitation coil 4 "E" is used to emit a known signal, resulting in the shown magnetic field Be. This can be achieved by applying an electrical excitation signal to the excitation coil 4, which signal preferably has a known characteristic, such as frequency, current strength, phase and/or modulation. To achieve such, excitation coil 4 can be connected or switched to an electrical excitation signal source, in particular a current source. The excitation signal is an alternating signal, preferably within the detection frequency range of the detector units 2 of the device 1, e.g. a substantially sinusoidal signal. For example with a frequency in arrange of some kHz to about 0.1 MHz, preferably e.g. about 5 kHz to 50 kHz, for example about 8 kHz or about 33 kHz are often preferred frequencies for detection purposes, wherein in general lower frequencies tend to be less susceptible to ground-effects where the nature of the soil can distort the magnetic field. Preferably, the excitation coil 4 according to the present invention emits a frequency below 1 MHz, in order to achieve reasonable soil penetration for the present application. Beside the determination of the depth value z, an advanced detection device based on the principles according to the present invention can also determine the distance value x, preferably when the device 1 comprises more than two detector units 2.

FIG. 3 shows an example of an embodiment of a principle setup according to the invention. The utility 10 is induced with an electrical current by the field emitted by means of the excitation coil 4 of the device 1. The top detector unit 2b and the bottom detector unit 2a are receiving said field, which is resulting from said current in the utility 10, by means of their respective detection loops 25a and 25b. The detection loops 25 are preferably substantially oriented similarly, so that at least two of them are substantially coupling with the magnetic field immediately emitted from the excitation coil 4. Or otherwise said, the excitation coil 4 is also coupling a portion of it's emitted excitation field directly to the detection loops 25a and 25b.

In the shown example, the excitation coil 4 has a primary emission in direction of the x-axis of the coordinate system 9 and the detection loops 25a and 25 are oriented to have their primary sensitivity similarly also in the x-axis of the coordinate system. Thereby, the excitation field Be from the excitation coil 4 will tend to straight away overdrive or saturate the detection loop 25 respectively the therewith connected receiving and evaluation circuitries, in particular while the sensitivity of the detector unit 2 is kept high to detect weak signals from utilities 10. The weak signals from the utility 10 which are indented to be picked up at the detectors can in particular be orders of magnitudes lower in intensity than an immediate or direct coupling of the excitation field Be.

Figure 4:
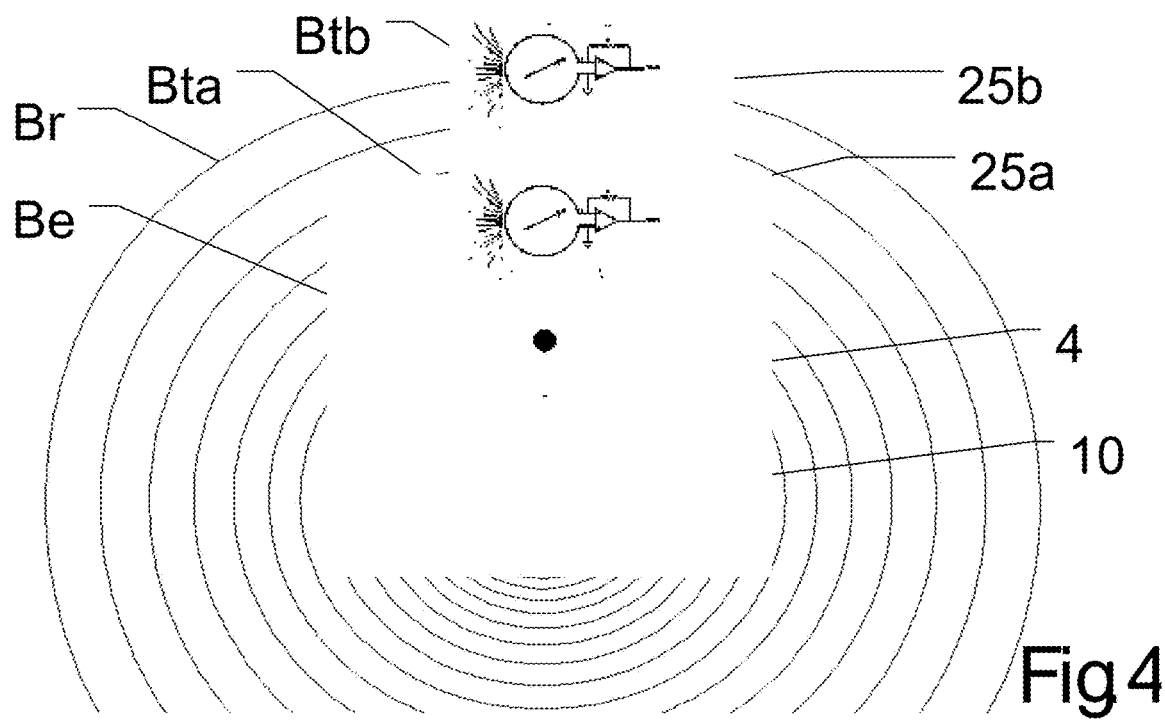
FIG. 4 shows a second example of an embodiment of magnetic fields at a detection device to which the present document relates.

FIG. 4 shows a similar view as FIG. 3, but with additional compensation fields Bta and Btb according to the present invention. The invention introduces a transmission loop 27 at the detector unit 2, which corresponds to the detection loop 25 of this detector unit 2. Corresponding in this sense can mean, that the transmitting loop 27 is associated or assigned to the detection loop 25 of the same detector unit 2, in particular in logical as well as in geometrical and physical sense—especially in sense of their respective magnetic characteristics. In other words, a detection loop 25 and a transmitting loop 27 comprised at the same detector unit 2a or 2b, are arranged close together, in a way that they substantially share their magnetic sensitivity/emission area, in particular their areas enclosed by their loops. In a preferred embodiment, such can for example be established when at least a magnetic field the transmitting area encircled or circumferenced by the transmitting loop 27 is substantially covering the magnetic field sensitivity area encircled or circumferenced by the detection loop 25. The term "substantially" can for example be expressed by the fact that the magnetic field sensitivity cross-section of the detection loop 25 and the magnetic field emission cross-section of the transmitting loop 27 can overlap by at least 80%, preferably by more than 95% to 100%. For example, in an embodiment which achieves such, the detection loop 25 and the corresponding transmission loop 27 can be coplanar and/or coaxial, at least substantially within a practically reasonable margin.

The transmitting coils 27 of one of the detector unit 2 according to the invention is therein provided as kind of nulling-coil, as according to the present invention it is designed and provided to be applied with a nulling signal. By this nulling signal, the transmitting loop 27 is producing the shown nulling field Bt at its corresponding detection loop 2. By this nulling field Bt, direct couplings from the field Be emitted by the excitation coil 4, which are present at the corresponding detection loop 25 can be cancelled out or nullified, preferably almost entirely but at least substantially, e.g. in an order of magnitude or at least halfway, to one tenth, hundredth, or less. According to the present invention, such nullification can be done temporary or continuously, preferably at least at the instance of time when signals from the detection loops are evaluated for the detection purpose. Thereby, the detection device according to the invention is configurable (or during active detection with the excitation coil turned on actually configured) to have no or substantially no magnetic field at the detection loop 25 in absence of a utility 10 to be detected. This in particular applies at least at—or in the range—of frequency in which buried utilities 10 are detected by the device 1, specifically at the frequency(s) of the excitation signal supplied to the excitation coil 4.

In presence of an electrically conducting utility 10, as shown in the figure—the emission coil 4 induces a current at the utility 10 and a corresponding magnetic field is radiated from the utility 10. This radiated field can then be detected by the detection loops 25a and 25b. Since according to the invention, there are substantially no other disturbing magnetic fields present at the detection loop 25 (at least in the relevant frequency range), it can detect weak field strengths, in particular weaker field strength than without the nullification according to the invention. Since there are no other disturbing magnetic fields, sensitivity and/or dynamic range of the detection (in particular of the detection loop in combination with subsequent amplification, signal conditioning and evaluation stages) can be increased so that lower absolute magnetic field values are detectable—in particular as saturation or overdrive of the detecting stage by larger direct coupling fields from the excitation coil 4 are suppressed. The required dynamic range of the receiving stage can thereby be shifted to lower signal levels resulting in finer resolution, and/or optionally maybe also being reduced. In the thereby resulting (almost) zero magnetic field environment at the detection loop, the desired field from the utility (although comparably weak in terms of absolute signal strength) is much better and more accurately detectable according to this aspect of the present invention. Or in yet other words, the ratio of the desired signal to the residual noise, in particular the residual noise directly coupled from the excitation coil 4 to the detection loop 25, can be improved by applying the nullifying signal to the transmission loop 27 at the detector unit 2. Such is achieved by a physical nullification of the magnetic field, not by numerical means only.

Figure 5:
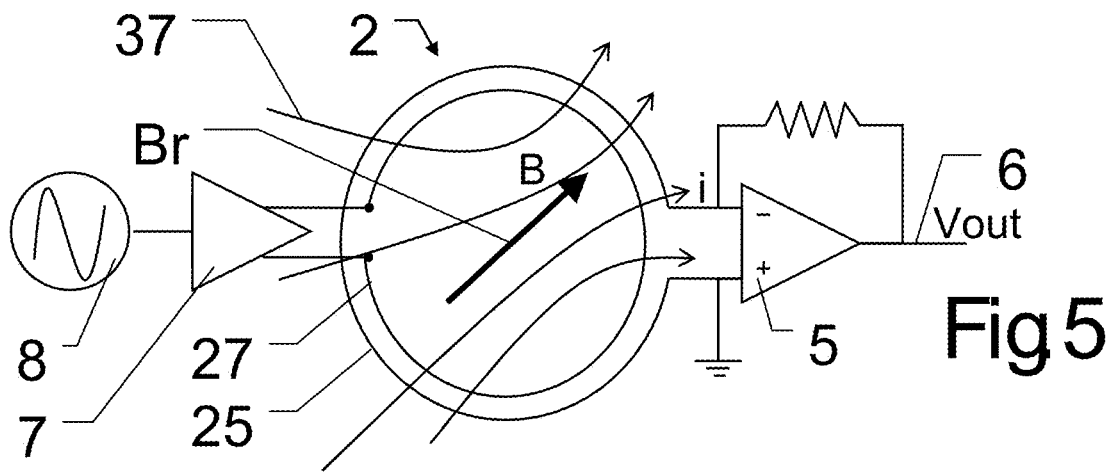
FIG. 5 shows an example of a structural diagram of embodiment of a detector unit according to the invention.

FIG. 5 shows an example of an embodiment of a detector unit 2 according to the present invention in order to explain its functionality. There is a detection loop 25 comprised at the detector unit 2, which is linked to an amplification stage 5 which provides the output signal 6 Vout to an evaluation unit. The amplification stage 5 can be embodied in different ways, preferably in form of current sensing amplification stage as shown, for example as a TIA. The here shown circuitry is reduced to the basic utility, but obviously the person skilled in the art will supplement it with further components for filtering, stabilisation, biasing, calibration, tuning, etc. as known in the art. For the current sensing stage 5, it is also advantageous to provide the detection coil 25 with a relatively low winding count, for example a single turn or up to a few tens of turns—but below thousands of turns as often used in prior art detection coil designs. Also lower series resistance, e.g. by larger conductor cross-sections and/or low resistance conductor material can be advantageous in such a design. Together with the detection loop 25, the detector unit 2 also comprises a transmission loop 27 as nullifying coil. The transmission loop 27 is therein arranged in geometrical proximity to the detection coil 25, in particular in such a way that both of the coils 25 and 27 share substantially the same sensitivity-area circumferenced by their windings. In other words, the areas in which the coils 25 and 27 are susceptive for magnetic fields are overlapping, preferably fully or at least as fully as technically reasonable and realizable, for example at least to more than about 90%.

The transmitting loop 27 is fed by a transmission-amplifier 7 according to a signal from a signal generator 8 providing the nullifying signal. Thereby, the nullifying transmission field 37 at the transmission coil 27 and at the corresponding detection loop 25 can be provided. During the detection of a utility, this transmission field 37 is overlapping the field B which is detected by the detection loop 25, and which comprises the field Br from the utility 10 to be detected as well as other undesired magnetic field portions, most dominantly those directly coupled from the excitation coil 4. According to the present invention, the transmission field 37 can be tuned to actively reduce or nullify the undesired magnetic field portions, in particular those directly coupled from the excitation coil 4 to the detection loop 25.

Figure 6:
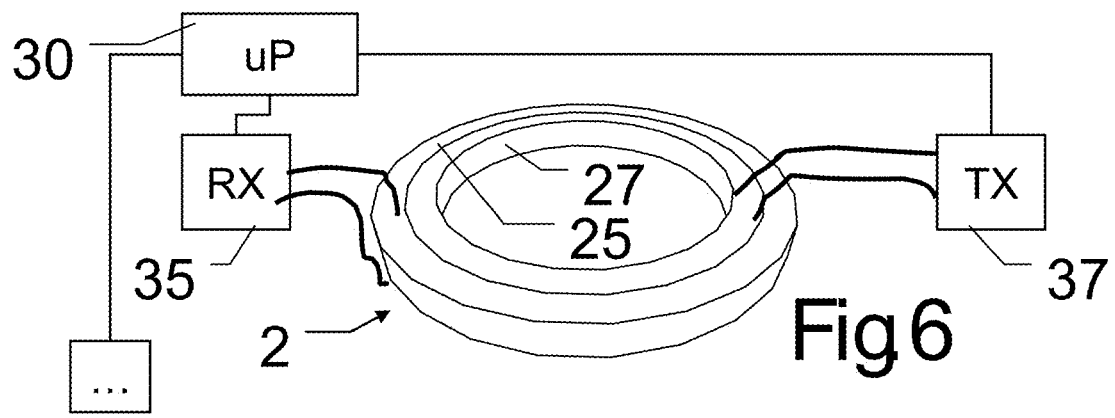
FIG. 6 shows a first example of an embodiment of a detector unit according to the invention.
Figure 7:
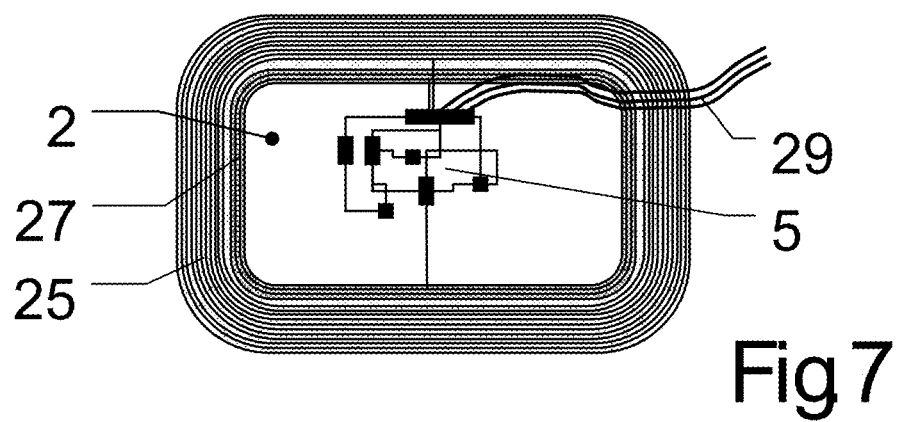
FIG. 7 shows a second example of an embodiment of a detector unit according to the invention.

In an illustrative example of a practical embodiment in FIG. 6 and FIG. 7, the two portions of the detectors 2 according to the present invention are shown. As mentioned, it's two loops or coils 25 and 27 in this embodiment are substantially in the same plane—so that any offsets in the vertical plane should be negligible, and they are also arranged substantially concentric and of substantially the same or close by diameters.

FIG. 6 shows an example of an embodiment of a detector 2 with wire-wound coils, embodying a detection loop 25 and nullifying transmitting loop 27, arranged in close proximity to each other. The circular shape is just an example and can also differ, e.g. being oval, rectangular, etc. The coils 25 and 27 can be independent of each other, but optionally also a tapped winding embodiment (with one common tap used for both, detection and transmitting) could be established to achieve the same independent functionalities of the detection loop 25 and nullifying transmitting loop 27. Also shown here are the RX detecting electronics 35 and the TX transmission electronics 37, linked to a controlling unit 30 comprising the controlling electronics microprocessor uP. As the detection device 1 according to the invention has at least two spaced apart detector units 2, there is also a link shown which runs to a second detection unit 2 according to the present invention, which can be similar or preferably equal to the one explicitly shown here.

FIG. 7 shows an example of an embodiment of a detector unit 2 with a PCB-made coils, embodying a detection loop 25 and a nullifying transmitting loop 27 arranged in close proximity to each other. In this embodiment, the windings of the coils 25 and 27 are made from tracks routed on a PCB (=Printed Circuit board). The printed circuit board can therein also comprise electronic components, for example at least part of the detection electronics 5 or 35 and/or the transmission electronics 7 and/or 37. The wiring 29 establishes the link to an evaluation and controlling electronics 30. An advantage of such a PCB design can be a highly coplanar arrangement of both loops, a very high reproducibility, in particular of the windings, especially compared to a copper windings, but also mass production can be improved, cost can be reduced and also at least part of the electronics 5 can be located in place with the windings—which helps reducing impact of disturbances and noise.

Figure 8A:
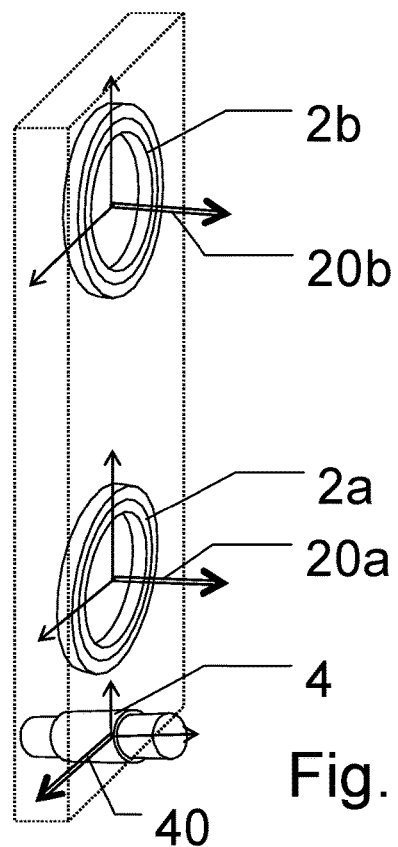
FIG. 8a and FIG. 8b are showing examples of embodiments of a detection device according to the invention.
Figure 8B:
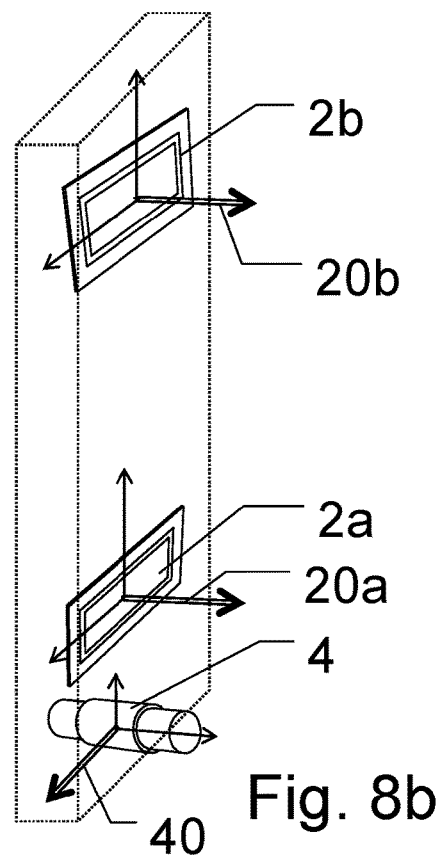

FIG. 8a shows a sketch of an exemplary embodiment with detector units 2a,2b in line with the example shown in FIG. 6 while FIG. 8b shows a sketch of an exemplary embodiment with detector units 2a,2b in line with the example shown in FIG. 7. As those approaches mainly differ in the already described embodiments of the detector units 2a,2b, they will be described together in the following.

The excitation coil 4 is shown as a wire wound solenoid coil around a magnetic core. Its dominant field emission 40 (indicated by the double-line arrow 40) is substantially in line with the coils axis and also with the primary sensitivity axis 20a,20b (indicated by the double-line arrows 20a,20b) of the detection loops 25 of the detector units 2a,2b. In the winding plane of the detection loop 25, e.g. indicated by the Cartesian arrows, the detection loop 25 encircles a sensitivity area of the detection loop 25. The detector units 2a and 2b and the excitation coil 4 are arranged in substantial or at least almost maximum coupling. Beside the shown arrangement, there might be additional options of arrangements.

The detector units 2 (e.g. 2a and 2b) also each comprise at least one transmission loop 27. Latter is arranged substantially equal or similar to the detection loop 25, preferably in a way that the transmission loop 27 substantially covers or shares sensitivity area with the detection loop 25. In other words, the transmission loop 27 is in a magnetic coupling arrangement to the detection loop 25, preferably to a very high degree. Such can e.g. be achieved by substantially sharing the same winding plane orientation of the loops 25 and 27 and/or having substantially concentric winding axis. The transmitting loop 27 and the detection loop 25 are therefore arranged close together, e.g. contiguous, adjacent or verging. By such a close set arrangement, the above described magnetic coupling can be achieved. For example, in an embodiment, the transmitting loop 27 can closely encircle the detection loop 25 or vice versa.

By a compensation unit of the device 1, an electrical signal can be applied to the transmitting loop 27 at the detector unit 2, for countering the any present magnetic field at the detection loop 25, such that it detects no, substantially no, or at least a reduced magnitude of magnetic field. According to the present invention, in particular direct coupling portions of a field Be directly from the excitation coil 4 are to be reduced or nullified. As the transmitting loop 27 is preferably coupling fully or almost fully to its corresponding detection loop 25, such can be done effectively and efficiently. Having multiple detector units 2, it has to be considered that the transmission loop 27a of one detector 2a will not only be coupling to its own detection loop 25a, but will also be partially be coupling to the other detection loop 25b of other detector units 2b. Nevertheless, such does not hinder the principle according to the invention, as this aspect is solved by individually adapting the nulling signal applied to each of the transmission loops 27a and 27b accordingly. This can be calculated, numerically modelled, tested or swept through. In static or quasi-static environments, the nullifying at each detector can also be done sequenced in time—and the measurements can be taken accordingly only when nullifying is established at a certain detector—while temporarily ignoring the readings from the other.

Figure 9:
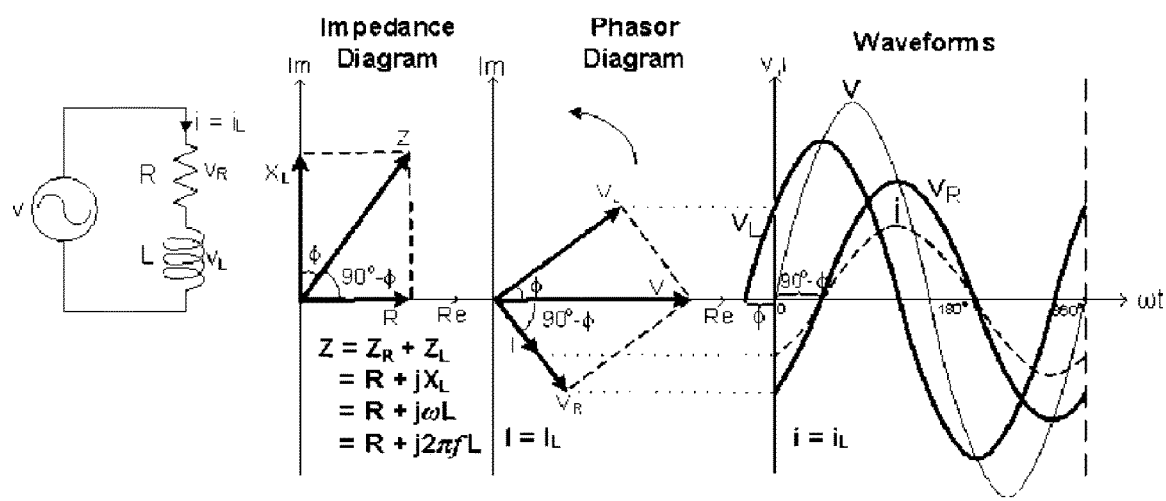
FIG. 9 shows an example of an embodiment of a signal diagram.

FIG. 9 shows an example of a basic signal analysis which can be employed according to the present invention.

The direct coupling signals of the emission coil 4, which needs to be cancelled at the detection loop 25 by the transmitting loop 27, are complex or vectors and there will be contributions from both detector unit's transmitting loops 27a and 27b, as well as from the excitation coil 4 at each of the detection loops 25a and 25b. Therefore, it can be not sufficient to simply apply a portion of the signal applied to the excitation coil 4 also directly to the transmitting loop 4—which would be a simple, straight forward approach. To achieve reasonable nullification, the signals have preferably to be demodulated and analyzed, in particular using complex mathematical calculations. The diagram shows, e.g. that a driving voltage applied to the excitation coil 4, e.g. as modelled on the left in a simplified manner, results in a complex impedance diagram shown right to it. This results in the phasor diagram showing in midst, which gives examples for the electrical conditions in a typical arrangement. To the right, there is a time-diagram, showing the corresponding waveforms. The current I—which is actually generating magnetic field—can be seen to be not conformant with the actually applied signal V. Similar considerations can be applied to the detection loop 25 and the transmitting loop 27 as well. For a nullification according to the invention, those have to be advantageously considered, in order to achieve demodulation and nullification up to a further improved, higher level.

Figure 10:
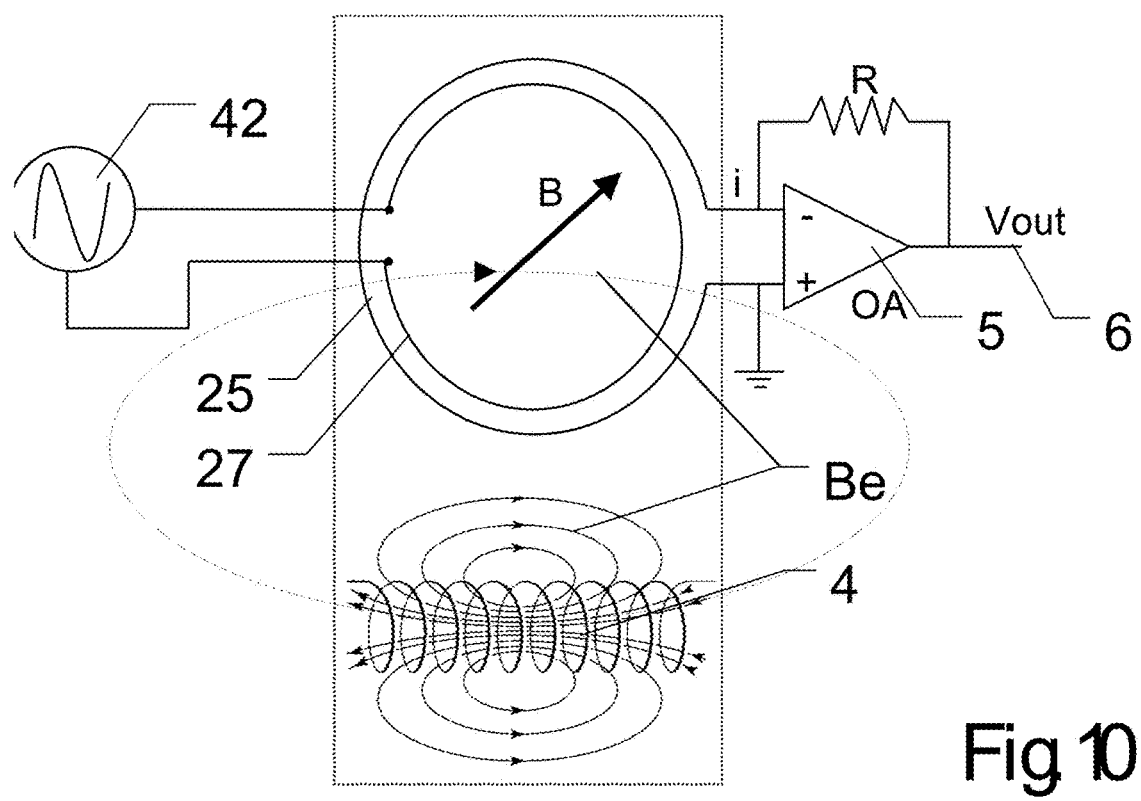
FIG. 10 shows an example of an embodiment of nullification at one of the detector units.

FIG. 10 shows a simplified example to explain a setup according to the present invention, where only one of the at least two detector units 2a and 2b are shown for simplicity. The excitation coil 4 is therein supplied with an excitation signal, from the excitation signal source 9 and emits the magnetic excitation field Be. There will be not only a coupling to the buried utility line 10 to be detected, but also some direct coupling of the magnetic excitation field Be to the detection loops 25a and 25b—likely such can be even stronger than the coupling to the utility 10. Therefore, the magnetic field B detected by the detection loop 25 will comprise some portion of the magnetic excitation field Be from the transmitting loop 4. According to the invention, the detection device 1 therefore provides a compensation unit 49, built to apply a nullification signal to a transmitting loops 27a and 27b of each of the detector units 2a and 2b for establishing a magnetic compensation field at the detection loop 25a and 25b which nullifies or at least reduces the portion of the magnetic excitation field Be directly coupled from the transmitting loop 4. The compensation unit 49 can therein in particular comprise the transmission-amplifier 7 and the signal generator 8.

In real world devices 1 there are almost always some variations, disturbances, deviations, drifts, displacements, etc. especially during field usage of the device 1. The arrangement of the detection units 2 and excitation coil 4 within the device 1 tends to be extremely sensitive to any mechanical movement, temperature changes, electronic drift etc.

In a special embodiment, a transmitting loop 27 according to the invention can be embodied as the same loop used for self calibration. Such self calibration is for example suggested in US 2016/0097874 or US 2016/0109608, which are herewith both incorporated by reference. Thereby, advantageously the aspect of a device self-calibration by a calibration signal transmitting loop 27 close to the detection coil 25 can be advantageously combined with the aspects of a nullification signal transmitting loop 27 close to the detection coil 25. Therein according to such a special embodiment of the invention, the calibration signal transmitting loop 27 and the nullification signal transmitting loop 27 can be the same transmitting loop used for different specific purposes, but also other components can be at least partially used for both. In contrast to the nulling of the present invention, the self-calibration will target on mutual signal rations in-between the two detection units when a calibration signal is applied to the transmission loops 27, whereof calibration parameter of the detection coils 25 can be derived to numerically equalize the sensitivity of the detection coils 25, in particular as explained in above cited documents.

Figure 11:
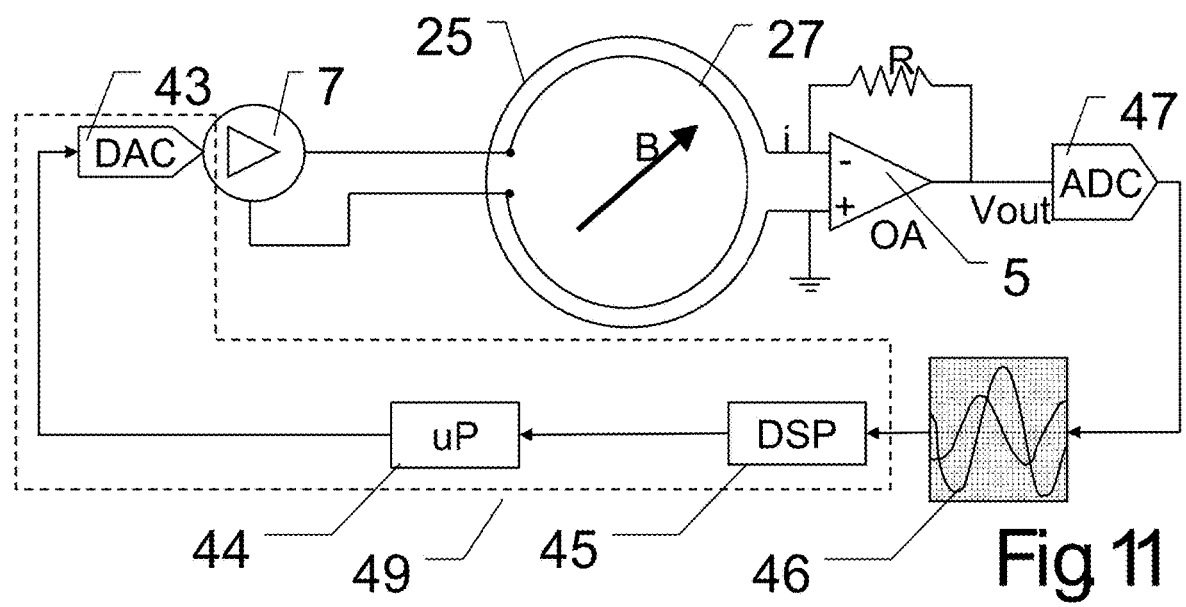
FIG. 11 shows an example of an embodiment of a signal flow path according to the invention.

FIG. 11 shows an example of a signal flow according to the present invention to establish the nulling signal. Therein, the detection loop 25 picks up the magnetic field value B, which is amplified and/or signal-conditioned (e.g. filtered) at 5 and the analog to digital converted at the ADC 7. Block 46 symbolizes the resulting signal, in which in particular phase and amplitude of field components from the excitation coil 4 is determined. In the shown example such signal analyzing and evaluation is symbolized by the Digital Signal Processor DSP 45 and the Microprocessor g 44 as examples for a computation unit to establish such. Such a computation unit can for example also be the same as used for utility detection, depth determination, providing the excitation signal, and/or other functionalities of the detection device 1. In this computation process, also additional information, e.g. about the waveform of the excitation signal, etc. can be included. The output is then used to drive the transmitting loop 27 to provide nullifying field, in the shown example comprising a digital to analog converter DAC 43 and the driving stage 7.

In an example of an embodiment, the nulling can be established by a control loop having a along time constant, in particular a time constant greater than the response time of the locator, preferably much greater, e.g. at least 3 times, 10 times or more. This control loop regulates the electrical signal applied to the transmitting loop 27 in order to achieve a substantially null signal as output of the detection loop 25 when no utility line signal is present. As the detection device 1 comprises at least two detector units 2, a drive signal for each transmitting loop 27 and 27b is calculated in such a way that the nulling is achieved at each of the detection loops 25a and 25b. Accordingly, the ADC, DSP, uP, DAC can have multiple inputs/outputs or be provided multiple times.

Figure 12:
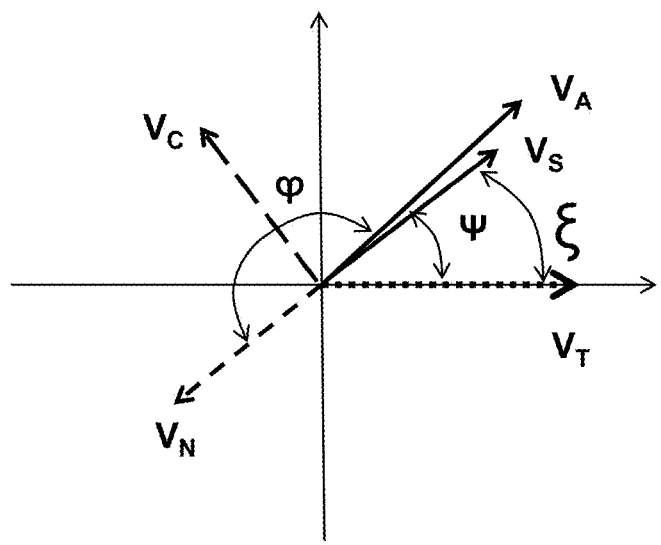
FIG. 12 shows an example of an embodiment of a vector diagram.

FIG. 12 shows an example of a vector-diagram of the signals at one detector unit 2. In a in a quite electromagnetic environment and with the excitation coil 4 emitting the excitation field B2, in particular without a utility 10 to be detected within reach, a nullification can e.g. comprise:

Setting the signal applied to the transmitting loop 27 to VT and measuring the electrical signal 6 VA from the detection loop 25, for example by capturing the values from the ADC 47. Based on this, calculating and outputting an electrical signal VN to the transmitting loop 27, for example by the DAC 43, such that VA will be forced to zero (or at least almost zero) will be done. As shown in the figure, such nullification is done complex in the present invention, not only by a simple scalar feedback gain which would not achieve sufficient nullification. Therein, the fact that all the signals are of substantially the same frequency can be used in the consideration. In particular, it can also be considered that the dominant frequency of interest is the one emitted by the excitation coil. In an embodiment, also the excitation signal applied to the excitation coil 4 can be taken into account, preferably in its amplitude and phase. Above can be repeated multiple times or in a continuous control loop to achieve nullification. The required setting for achieving the nullification can be stored for further usage, either directly or as initial value for the next nullification regulation. Alternatively, the nullification can also be executed each time the active detection is turned on.

After the nulling process described above, the actually or "real" signal to be detected from a conductive utility 10 that comes into reach of the detection, will be in phase with the transmitted signal from the excitation coil 4, while "secondary" signals—e.g. by capacitive induction between utilities, etc.—will be out of phase. By considering such in signal evaluation, the detection results can be improved.

A detection of a utility can then comprise for example:
Transmitting the signal VT by the excitation coil 4.
The detection loop 25 then picks up the received signal VA due to VT, which could be out of phase by $\Psi$.
The transmitting loop is driven with a nulling signal VN (from a DAC), arranged in such a way, that VA→0, with a phase $\varphi$.
VS is the desired signal, emanated from the utility 10 to be detected, which is substantially in phase with VA, with a phase $\xi$.
The further signal VC shown in the diagram is a coupled utility 10 signal, which will in general be out of phase with VS.

For two or more detector units, there will also be an interaction between them resulting in magnetic components that will also require nulling out. Those are left out for readability, but can be considered in the same manner as discussed in the nullification described above.

Figure 13:
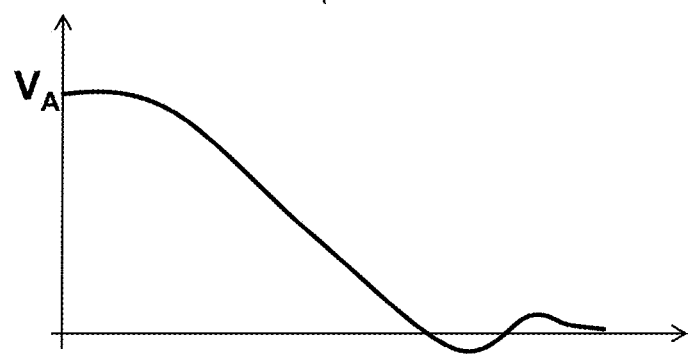
FIG. 13 shows an example of an embodiment of a nullification by a low time constant control loop.

FIG. 13 shows a time-diagram of an example of the nullifying according to the invention. Therein an iterative loop is established, which his determining amplitude and phase of the detected signal $V_a$ from the detection loop 25a, applying calculations to reduce $V_a$ to zero, in a simple, illustrative example this can comprise multiplying VN by a complex coefficient. For example, assume that:

The emitted signal of the excitation loop 4 is of the form VT=VTM sin($\omega$t).
The received signal 6 from the detection loop 25a is VA=VAM sin ($\omega$t+$\Psi$).
The output to transmitting loop 27a for nulling is then VN=VNM sin ($\omega$t+$\Psi$+$\varphi$)

In this simple example, it is not considered that there will be also a component from second transmission loop 27b of the second detector unit 2b which also needs to be nulled out—but such is straight forward to be applied.

Figure 14:
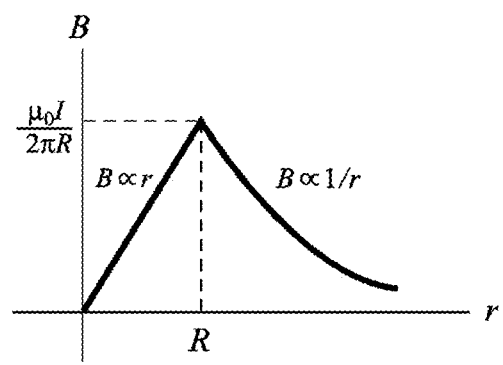
FIG. 14 shows an example of an embodiment of a magnetic field diagram.

FIG. 14 shows a diagram of an example of the excitation field Be used according to the invention and the excitation coil 4 and the excitation signal supplied to it.

The excitation coil 4 of the embodiment in this example has a ferrite core, although there are alternative designs which can be used for the present invention as well. The coil 4 located in separation z above a conductive utility 10 to be detected and is driven by an alternating excitation current which is generating a magnetic field Be. The utility 10 is assumed to be conductive, with a diameter dc and orientated roughly in 90° to the magnetic field.

According to the Biot-Savart Law for the field from a solenoid, it can be shown that the field at distance z is:

$$Bz = \frac{\mu_0 \mu_r}{4\pi} \frac{2\pi R^2 i_t n}{(z^2 + R^2)^{3/2}} \sin(wt),$$

with: I=coil current, R=coil radius, n=turns, z=distance from coil, $\mu r$=permeability of the Ferrite core, and sin(wt) expressing the ac current frequency.

For explanation, a starting point can be to consider the arrangement as having a mutual inductance M between the excitation coil 4, and the buried conductive utility 10. This can be defined as the proportionality between the emf generated in the conductive utility 10 to the change in current in the excitation coil 4 which produced it.

When z>>R, which is reasonable for the utility detection, the Magnetic Field from the solenoid approximates to:

$$Bz \sim \frac{\mu_0 \mu_r}{2\pi} \frac{i_t A_t}{z^3},$$

wherein A is the cross sectional area of the coil 4.
Developing the analysis, the magnetic field at the underground utility 10 can be approximated by:

$$Bz \sim \frac{\mu_0 \mu_r}{2\pi} \frac{i_t A_t}{z^3} \sin(wt).$$

There will be an induced current in the inductor due to this field, also, this induced current will give rise to a magnetic field (according to the Reciprocity Theorem) which is what the present invention aims to detect with the detection loops 25 of the locator device 1.

From the Biot-Savart law, it can be shown that the field inside a long conductor is given by:

$$Bc = \frac{\mu_0}{2\pi} \frac{i_c r_c}{R^2} \sin(wt),$$

where R=radius of the conductor, $r_c$=distance from centre, $i_c$=current induced in inductor from field generated by the excitation coil 4.

The thereof resulting field at the surface of the utility 10 is shown in the figure, where R is the radius of the utility 10.

Assuming that, at the surface of the utility 10, these fields are equal, gives:

$$B = \frac{\mu_0 \mu_r}{2\pi} \frac{i_t A_t}{z^3} \sin(wt) = \frac{\mu_0}{2\pi} \frac{i_c r_c}{R^2} \sin(wt) = \frac{\mu_0}{2\pi} \frac{i_c}{R} \sin(wt).$$

This can be considered to provide a simple—if approximate—relationship between the current in the conductive utility 10 and the current in the excitation coil 4.

Another factor is the (dimensionless) geometry of the system, from:

$$B = \frac{\mu_0 \mu_r}{2\pi} \frac{i_t A_t}{z^3} \sin(wt) = \frac{\mu_0}{2\pi} \frac{i_c}{R} \sin(wt).$$

Summarized, the current in the conductive utility can be (at least approximately) be expressed as:

$$i_c = \frac{\mu_r \cdot R \cdot A_t \cdot i_t}{z^3},$$

with: ur=relative permeability of the ferrite core, At=cross sectional area of the excitation coil 4, R=radius of the conductive utility 10, z=separation of the excitation coil 4 to conductive utility 10 (≈depth), it=current in the excitation coil 4.

The herein shown formulas are shown exemplary to explain the basic principle and to show that it is physically and logically possible to achieve a nullification based on the principle according to the present invention. In other embodiments of the present invention, the basic formulas from above can be modified, e.g. to better match the actual physical conditions. For example, the magnetic field formulas can be adapted to an actual coil design, some parameters can be chosen differently, parameter estimation, a least square fit, a nonlinear calibration model, etc. can be used to determine parameters, etc.

Figure 15:
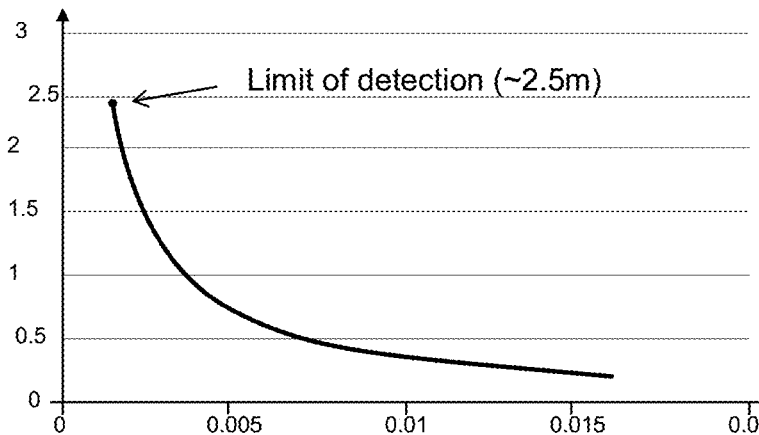
FIG. 15 shows an example of an embodiment of a utility current vs. depth diagram.

FIG. 15 shows a diagram of an example of the general dependencies of an achievable current at the utility 10 by an excitation coil 4. For example the excitation coil 4 is assume to have rather typical values for this application of a solenoid with a length of about 10 cm, and a radius of about 5 mm, with a core having $\mu_r$ of about 10000. The excitation current assumed to be e.g. 1A. It can be seen that in this example, the limit of detection will be about 2.5 m depth with increasing utility current (shown in Ampere at the abscissa) for shallower depths z (at the vertical axis in meters).

Figure 16:
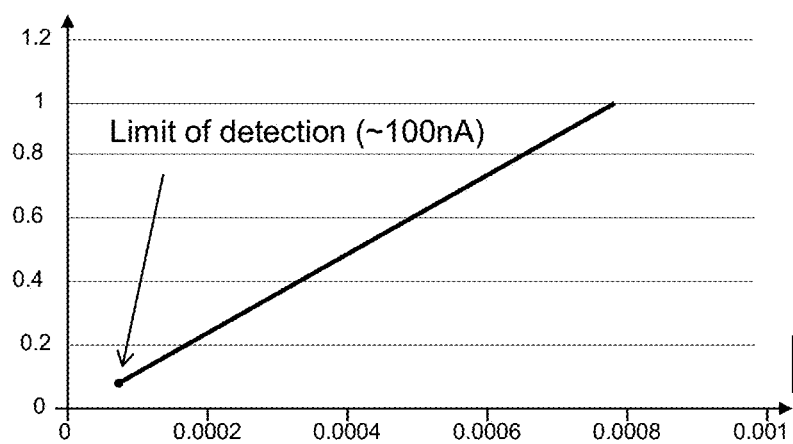
FIG. 16 shows an example of an embodiment of a utility current vs. excitation current diagram.

FIG. 16 shows a diagram of an example of the general dependencies of the current at the utility 10 (shown in Ampere at the horizontal axis) versus the current supplied to the excitation coil 4 (shown in Ampere at the vertical axis), in particular with a coil design as suggested in the example above. A typical limit of detectability is therein in the order of magnitude of about 100 nA. The dependency will be substantially linear.

Figure 17:
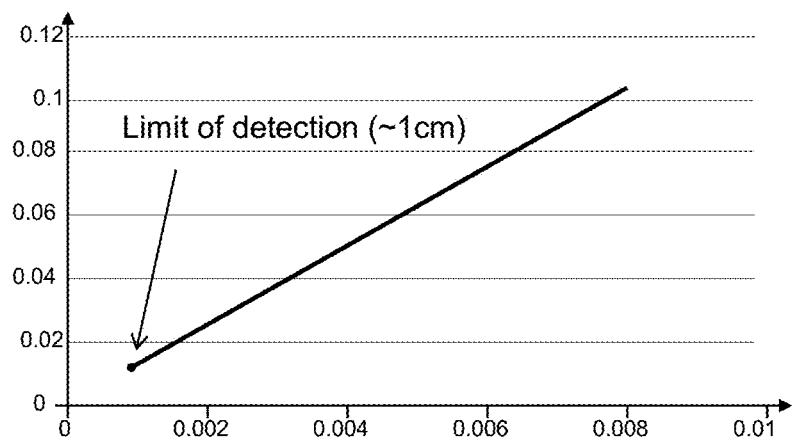
FIG. 17 shows an example of an embodiment of a utility current vs. utility radius diagram.

FIG. 17 shows a diagram of an example illustrating that also the diameter of the utility 10 influences detectability, by showing the utility radius in meter at y and the corresponding utility current in ampere at x, for an example of the utility 10 buried at 1 m depth. The dependency will be substantially linear.

Figure 18:
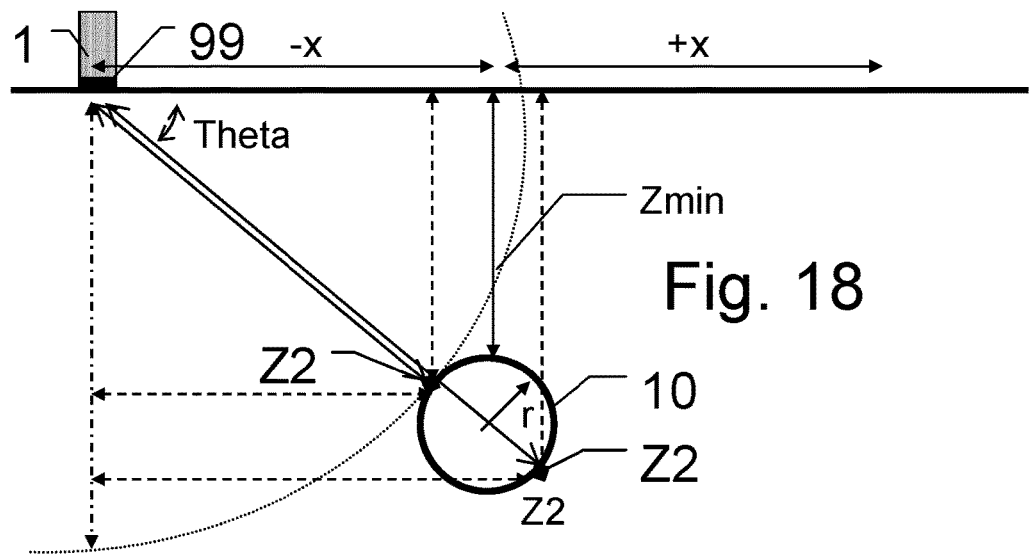
FIG. 18 shows an example of a specific embodiment of a detection by a mobile detection device according to the invention comprising an additional GPR.

FIG. 18 shows a specific embodiment of a detection device 1 according to the invention, which comprises an above specified magnetic detection with the two detection units 2 and the excitation coil 4 combined with an optional Ground Penetrating Radar (GPR)-unit 99. The diagram illustrates a practical example of such a detection device 1, which is traversing above a sub surface hollow pipe 10 as utility line to be detected. The utility 10, of which the distance information Zmin is of high relevance for excavation purposes, results in a primary GPR-reflection signal originating at Z1, as well as in a secondary GPR-reflection at Z2, which are resulting from the changes of high permittivity, e.g. by a plastic pipe 10 in moisture soil 12. According to the shown dimensions and the formulas $$Z1=((X-(r \cdot \cos \text{Theta}))+(Z \min+(r-r \cdot \sin \text{Theta}))^2)^{1/2}$$

and $$Z2=((X+(r \cdot \cos \text{Theta}))+(Z \min+(r+r \cdot \sin \text{Theta}))^2)^{1/2},$$

with the shown and mentioned parameters, the distance values for Z1 and Z2, and consequently also Zmin can be determined according to the GPR-reflection and their time of flight. In addition, also the x-position of the pipe 10 can be determined as it can be seen from further geometrical considerations for Z1 and Z2. The combination of the present active detection with a GPR-detection provides improved detection results for non-signal carrying and non-conductive utility lines. The GPR detection results can be best shown in X-Z-slices, which are shown in the following.

FIG. 19a, FIG. 19b, FIG. 19c and FIG. 19d are showing some examples of specific detection results of a specific embodiment of a detection according to the invention as described in FIG. 18.

Figure 19A:
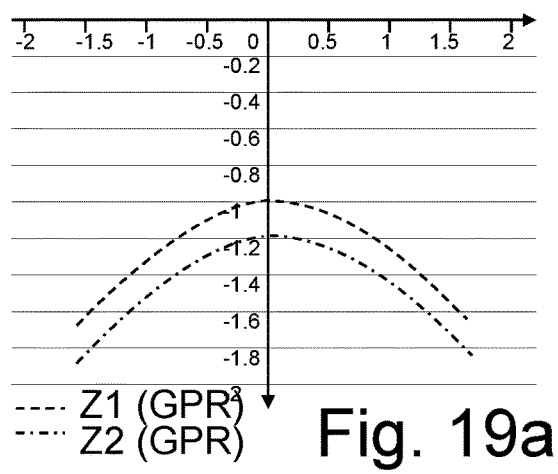
FIG. 19a, FIG. 19b, FIG. 19c and FIG. 19d are showing examples of embodiments of detection diagrams from the embodiment of FIG. 8.

FIG. 19a shows two dimensional diagrams in form of a GPR X-Z-slice through the ground over a large diameter plastic pipe 10, with depth z and horizontal displacement x along ground (exemplary values given in meters respectively). Shown are the curves of the GPR detection results of the determine distance values, in particular the z values from above, since the magnetic detector units 2 will likely not pick up any reasonable detection signal due to the non-conductive nature of the pipe. There are two dominant signals Z1 (GPR) and Z2 (GPR) received which are resulting from GPR-reflections at the interface boundaries of the utility line 10, as primary reflection Z1 and secondary reflection Z2. The utility 10 can therein be kind of e.g. a hollow plastic pipe, buried in 1 m depth, which information can for example also be derived and provided by the detection device, based on the shown diagram.

Figure 19B:
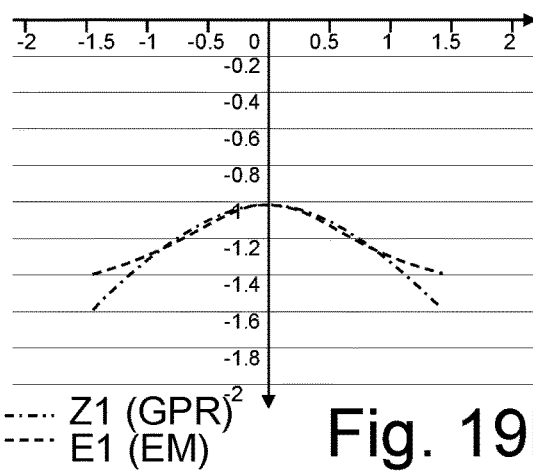

In FIG. 19b there are two signals received, whereof the Z1 (GPR) results from a GPR reflection and whereof E1 (EM) results from an electrical current at the utility line, in particular as induced by the excitation coil 4 at the detection device 1. According to this aspect the invention, both detection methods can be executed by the detection device 1, in particular simultaneously or quasi-simultaneously. The utility 10 can therein be e.g. a relatively thin conductive pipe, an electrical power supply line or a communication cable, buried in 1 m depth at x=0. By evaluating the points at with the two graphs intersect, further information can be extracted, e.g. with respect to the detection devices antenna geometry, utility depth, diameter, etc.

Figure 19C:
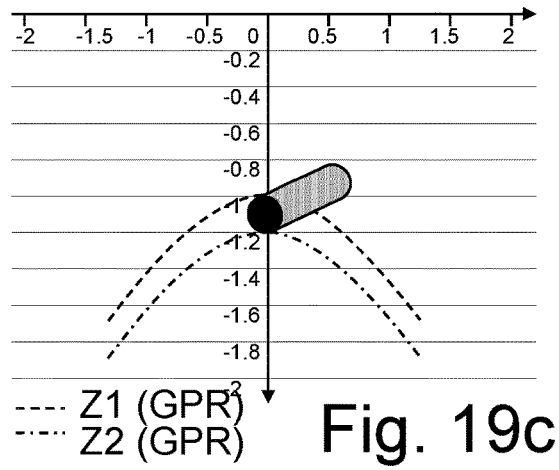

In FIG. 19c there are two signals Z1 (GPR) and Z2 (GPR) received from GPR. Although the active detection with its emission coil 4 is turned on, there is no magnetic field detected, wherefore it can be concluded that the utility 10 can likely be e.g. a plastic gas pipe with a diameter of about 20 cm at a depth of about 1 m.

Figure 19D:
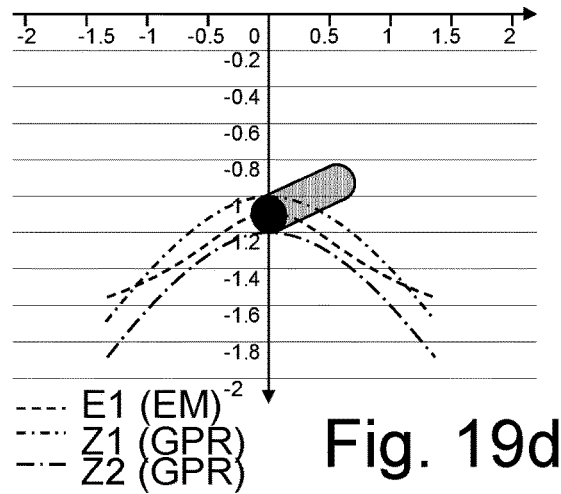

In FIG. 19d there are three signals received, whereof the Z1 (GPR) and Z1 (GPR) results from GPR-reflections and whereof E1 (EM) results from a naturally occurring or artificially conducted current at the utility 10. Most likely, the detected current at the utility line 10 will be resulting from the excitation field emitted at the detection device 1—which can be identified according to its frequency and/or signal shape, and this information can be provided by the device. The utility 10 will therefore be a large diameter conductive pipe. As pipes of such diameter are mostly not current-carrying on their own, it can e.g. be a plastic water pipe of a diameter of 20 cm, at a depth of 1 m, but it could be as well an electrical cable within a plastic pipe or the like. The detection device can not only present the shown combined images, but can optionally also analyze the information of the diagrams and suggesting most likely interpretations of the diagrams.

Figure 20:
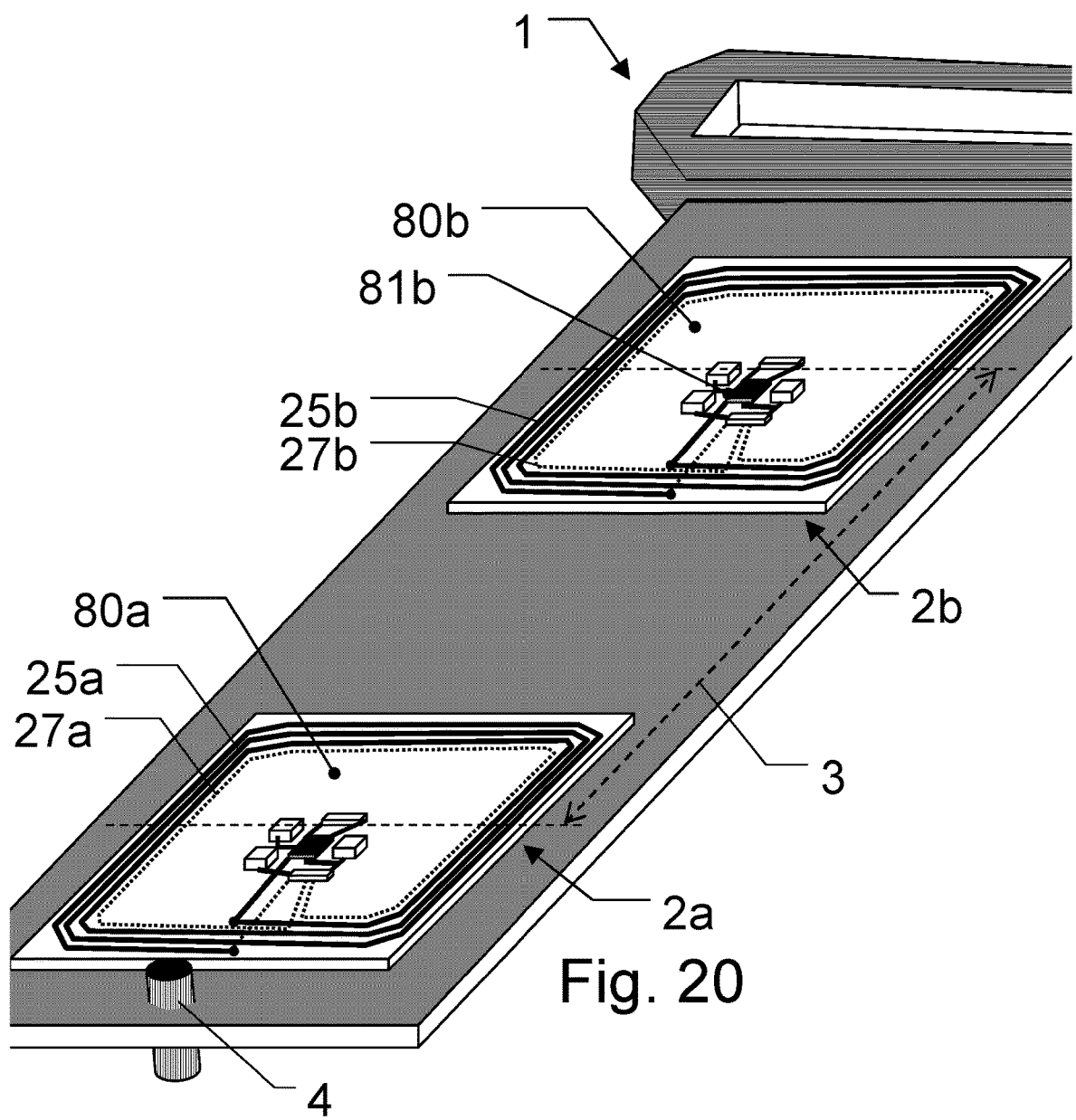
FIG. 20 shows an example of an embodiment of a detection device according to the invention.

FIG. 20 shows an example of a device 1 according to the invention. The detection device 1 comprises at least a first detector unit 2a and a second detector unit 2b and an excitation coil 4 in a common housing. The excitation coil 4 is embodied as a solenoid with a ferrite-core. The excitation coil 4 in this example is arranged with its axis substantially horizontally, when the device 1 is held in upright detection position. The shown embodiment comprises a PCB Antenna design for the two detector units 2a and 2b, which are arranged with a defined spacing 3 and substantially vertically when the device is held in upright detection position. The specific alignments are exemplary only, as the invention primary has to be build in such a way to achieve a decent magnetic coupling of the excitation coil 4 to the utility line 10 and from the utility line 10 to the detection loops 25a,25b. The two detector PCBs 80a and 80b can preferably be equal. Each detector PCB 80a and 80b comprises a detection loop 25a (resp. 25b) linked to evaluation electronics 81a (resp. 81b) which can be located at least partially at the same PCB 80a (resp. 80b). The detector PCB 80a and 80b also comprises additional transmitting loops 27a (resp. 27b), which are build and controlled in such a way that unwanted directly coupled magnetic signals from the excitation coil 4 can be demodulated or "cancelled out" or nullified at the detection loops 25a,25b. This nullifying is done by applying a nullification signal to the transmitting loops 27a,27b, which opposes the unwanted magnetic signals at each detection loop 25a,25b to be force to be substantially zero. Thereby, the present invention physically cancels out a direct coupling from the excitation coil 4 by using the "Nulling" transmitting loop 27 aligned closely to the detection loop 25 which is used for detection of the utility 10. Advantageously, detection and transmitting loops can be embodied as copper turns on the PCB 80. Demodulation of the excitation coil signal is simplified by the PCB-fabrication antenna design. A PCB detector unit 2 is advantageously having the "Nulling" transmitting loop 27 in close proximity to the detection loop 25, providing the same winding plane for the loops 25 and 27 and providing high reproducibility of the geometry. For reducing electric fields, which might disturb the measurement, graphite paint can be applied at critical areas at the device 1.

The device 1 can therein be once configured to cancel out the residual excitation signals at the top and bottom detector units 2a and 2b in a quiet electromagnetic environment, and afterwards, the locator can be used as it normally would be used without further adjustments—wherein the mechanical stability of the PCB-coils can be advantageous. Beside a one time determination of a nulling configuration, The residual signals can also be constantly monitored for changes in the electronics due to thermal drift or slight mechanical changes, etc. and can be nulled out again, preferably with a time constant being longer than the detection rate.

As any conductive utility 10 is traversed, a detectable signal will be induced in the utility 10. The present design also allows to use the active detection based on the excitation signal in parallel with a classic passive detection of naturally field emitting utilities. For example, by turning of the excitation signal such classical signatures can be passively detected, and also a sequential switching in-between active and passive detection modes can be implemented. According to the invention, also an active and passive detection in parallel can be established by analyzing the signals from the detection loops for such classical passive utility signatures and active signatures at the same time. According to simple mathematical models, it can be predicted from the response from the active detection analysis and the passive detection, as they traverse a sub surface utility what kind, size, etc. the utility is.

Figure 21:
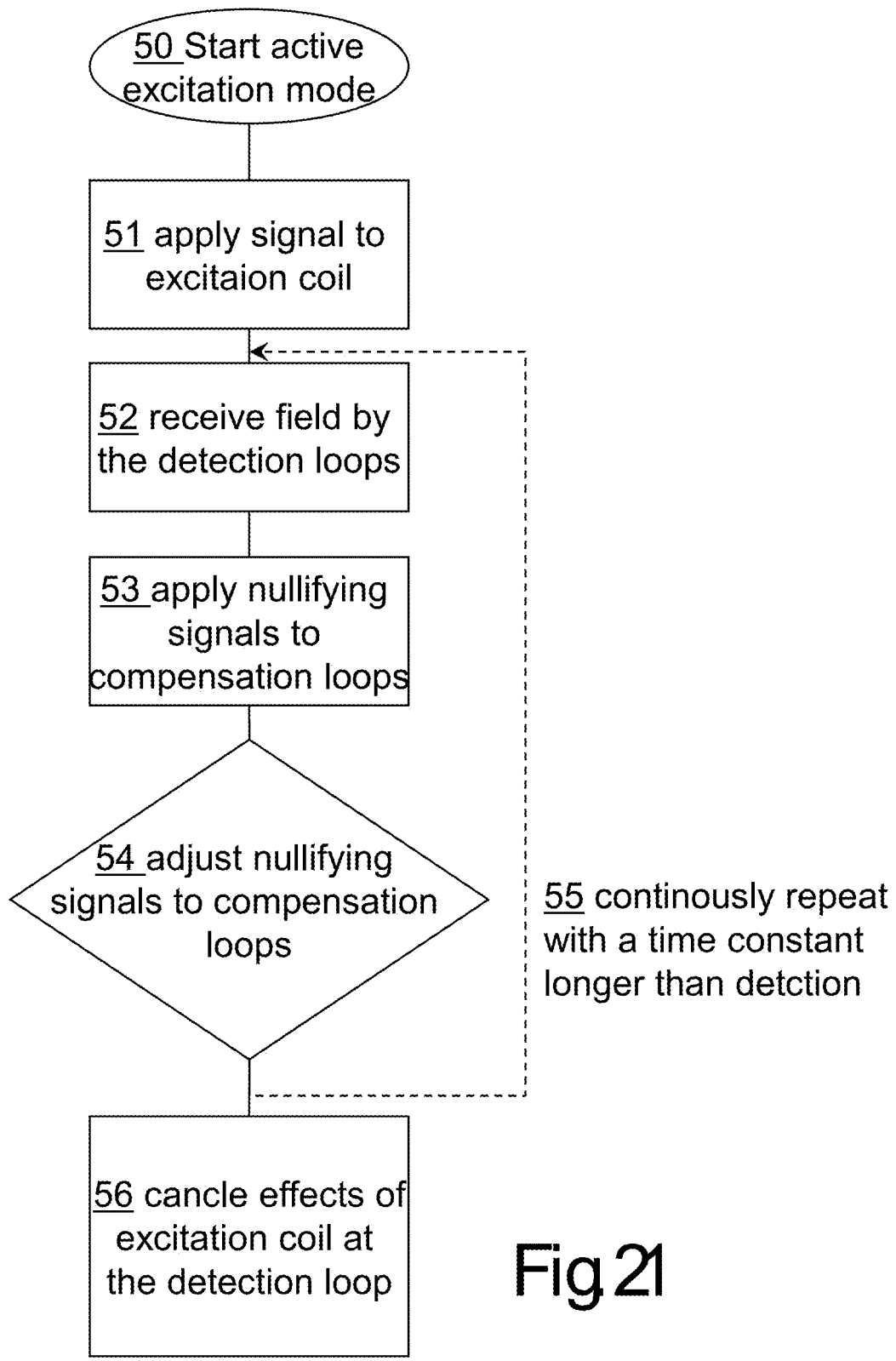
FIG. 21 shows an example of a block diagram of an embodiment of the invention.

FIG. 21 shows an example of a basic block diagram of an embodiment of the present invention that shows a functional flow of the active detecting using an excitation coil 4 at the detection device 1 according to the invention.

In block 50 a nullifying routine according to the present invention is started. Such can be done in a quiet electromagnetic environment, in particular without a utility to be detected within reach, for example once in while as specific automatic reconfiguration routine. Such can also be done in a perpetual control loop during detection, with a time constant being much longer than the time for detection, in such a way that long term drifts and deviations of the device's hardware will be re-nullified but short time changes of the magnetic conditions, in particular as they occur during the detection of a utility will not be nullified. The active detection as well as the nullification according to the present invention can be achieved automatically by the device 1 itself, independent of external equipment.

In block 51, the compensation unit of the device 1 applies an electrical excitation signal to the excitation coil 4 at the detection device 1. The excitation signal is an alternating signal, for example, a sinusoidal signal of a defined frequency, but it can also be a signal of different shape, varying frequency of further modulated and/or coded. The excitation coil 4 emits a corresponding magnetic excitation field. This excitation field is substantially oriented in such a way that it does couple to the utility line 10. Due to the geometric setup, also significant portions of the excitation field will be directly coupled to and detected by the detection loops 25 (25a and 25b).

In block 52, a receiving or detecting of magnetic fields by the detection loops 25 is done. Therein, direct coupling portions of the field from the excitation coil, which are directly coupled to the detection loops 25 are therein demodulated and determined, in particular such can be done in knowledge of the excitation signal. For example, a complex transformation of the excitation signal can be applied with changes in amplitude and phase, but also other more complicated mathematical approaches can be applied. The result is a nullifying signal to be applied to the transmitting loops 27 for active magnetic compensation at the detection loops 25.

In block 53, an applying of a nulling signal to the transmitting loops 27, which are geometrically or magnetically close by to the detection loops 25 for compensation is done. Thereby the transmitting loops 27a and 27b are generating a magnetic field which counters the direct coupling fields from the excitation coil to substantially zero them out. Thereby, the detection loops 25a and 25b are not saturated by the direct coupling field and susceptibly for the actual fields originating from the utility 10 (which actually has to be detected) is improved. The detection loops 25a and 25b are configured in ordinary receiving mode, as they are, when an occluded utility line is detected in a regular detection mode.

In block 54, a adjustments to the nullifying signals to the transmitting loops 27a and 27b for compensation is done— at least until a sufficient nullification is achieved. The settings of the nullifying signals required for the nullification can also be stored. The nullifying signal can therein also be determined in a control loop, built to bring directly coupled signal portions from the excitation field at the detection loops 25 to zero or virtually zero. This is indicated by the loop 55, which is done with a slower timing than the detection, such that static or quasi-static direct couplings are reduced, but dynamic variations of the fields, as they occur during ordinary detections, are not nullified.

In block 56, cancelling effects of the excitation coil at the detection loops 25 is established. Thereby ordinary detections of magnetic fields originating at the utility 10, regardless whether those currents result from naturally occurring signal at the utility 10 and/or from currents resulting from the field of the excitations coil 4.

A skilled person is aware of the fact that details, which are here shown and explained with respect to different embodiments, can also be combined with details from other embodiments and in other permutations in the sense of the invention.

The invention claimed is:

1. A mobile detection device for an evaluation of a depth value from the device to an occluded underground elongate utility line, the mobile detection device comprising:
 a first detector unit and a second detector unit and an excitation coil in a common housing wherein, when the detection device with the common housing is held in upright detection position, the two detector units are arranged with a vertical spacing, the excitation coil is arranged at a bottom of the housing below the bottom one of the detector units and an excitation coil axis of the excitation coil is substantially horizontal, wherein:
 the first and second detector unit each comprise at least:
  an air core detection loop with at least one winding of an electrically conductive material, and
  a corresponding transmitting loop with at least one winding of an electrically conductive material,
  wherein the air core detection loop and the corresponding transmitting loop are arranged contiguous to each other, and the first and the second detector units are arranged with the spacing with respect to one another;
 the excitation coil includes a ferrite core and is designed for emitting an alternating electromagnetic excitation field of a defined characteristic, the excitation coil being arranged in such a way that a sensitivity direction of the detection loop is substantially in line with a field emission direction of the excitation coil;
 an electronic signal evaluation unit for detecting the occluded underground elongate utility line according to an electrical signal induced in the air core detection loop of each of the first and second detector units and evaluating a depth value according to a difference of the electrical signal between the air core detection loop of the first and second detector units, and
 a compensation unit configured to apply the electrical signal to the corresponding transmitting loops of each of the first and second detector unit for establishing a compensation field by the transmitting loops, wherein the compensation field is configured to substantially nullify influences of the excitation field at the air core detection loop.

2. The mobile detection device according to claim 1, wherein the air core detection loop and the corresponding transmitting loop are concentric and adjoin each other.

3. The mobile detection device according to claim 1, wherein the air core detection loop and the corresponding transmitting loop are magnetically coupled.

4. The mobile detection device according to claim 1, wherein the air core detection loop is connected to an input of a RX-amplifier of a receiving section, and wherein the transmitting loop is connected to an output of a TX-amplifier of a transmitting section.

5. The mobile detection device according to claim 1, wherein the mobile detection device further comprises:
 a self calibration unit for a calibration of a sensitivity of the air core detection loops by transmitting and evaluating a calibration field mutually between the first and the second detector units, wherein the same transmitting loop is used for transmitting a calibration field during self calibration with the excitation coil turned off, as well as for a transmitting of the compensation field during active detection with the excitation coil turned on.

6. The mobile detection device according to claim 1, wherein a coil-plain of the excitation coil is substantially parallel to a coil-plain of the first and second detection loop, and the excitation coil is arranged asymmetrically with respect to the first and second detector units.

7. The mobile detection device according to claim 1, wherein the air core detection loops and the corresponding transmitting loops are embodied as tracks on a single PCB.

8. The mobile detection device according to claim 1, wherein the compensation unit comprises a control loop for adjusting the compensation field to achieve nullification, with a time constant being longer than a time constant for detecting the occluded underground elongate utility line.

9. The mobile detection device according to claim 1, wherein the compensation unit is built for a simultaneous applying of an individual electrical signal to each of the transmitting loops at both the first and second detector units and for a controlling of the applied individual electrical signals such that a simultaneous nullification at both the first and second detector units is established.

10. An detection method for evaluating of a depth value of an occluded underground elongate utility line by a mobile detection device with$_7$ a first detector unit and a second detector unit and an excitation coil in a common housing wherein, when the detection device with the common housing is held in upright detection position, the two detector units are arranged with a vertical spacing, the excitation coil is arranged at a bottom of the housing below the bottom one of the detector units and an excitation coil axis of the excitation coil is substantially horizontal, the method comprising:
 emitting an alternating electromagnetic excitation field of a defined characteristic by applying an excitation signal to the excitation coil with a ferrite core;
 detecting a magnetic field by at least two detector units, which are arranged in a defined spacing with respect to one another, each comprising an air-core detection loop having at least one winding of an electrically conductive material, wherein the excitation coil and the air-core detection loops are arranged in a coupling arrangement, such that the sensitivity direction of the detection loop is substantially in line with the field emission direction of the excitation coil;

applying a nullification signal at a transmitting loop having at least one winding of an electrically conductive material, which is contiguous to a corresponding detection loop, whereby a nullification of direct influences of the excitation field from the excitation coil to the air-core detection loops by establishing a magnetic compensation field by the transmitting loop, which counters the excitation field to substantially zero at the air-core detection loops; and evaluating the depth value from the mobile detection device to the occluded underground elongate utility line according to a difference of the electrical signal in-between the detection loops.

11. The method according to claim 10, wherein applying the nullification signal to the transmitting loops comprises:

evaluating a received signal from the detection loops for direct portions of the excitation signal, applying an complex transformation in amplitude and phase to the excitation signal and applying the resulting nullification signal to the transmitting loop.

12. The method according to claim 10, wherein the magnetic compensation field is adjusted automatically by a control loop for nullification.

13. The method according to any claim 10, wherein evaluating of the depth value comprises:

a detecting of magnetic fields from utility-line currents which are induced by the excitation field;

and wherein the depth value is combined with a detecting of magnetic fields from naturally occurring or artificially conducted utility-line currents.

14. A computer program product including program code stored on a non-transitory machine-readable medium for an excitation signal nullification at a detection device with a first detector unit and a second detector unit and an excitation coil in a common housing wherein, when the detection device with the common housing is held in upright detection position, the two detector units are arranged with a vertical spacing, the excitation coil is arranged at a bottom of the housing below the bottom one of the detector units and an excitation coil axis of the excitation coil is substantially horizontal, the computer program product, when executed by a computer, performing a method comprising:

analyzing a digitized output signal from a detection loop of one of the detection units;

identifying and evaluating a direct coupling portion of an excitation signal from the excitation coil of the detection device within the digitized output signal;

calculating a desired nullification signal for nullifying the direct coupling portion of an excitation signal; and providing the desired nullification signal to be supplied as an analog nullification current at a transmitting loop for emanating a magnetic nullification field at the detection loops.

* * * * *